(12) United States Patent
Raghunath et al.

(10) Patent No.: US 10,599,444 B2
(45) Date of Patent: Mar. 24, 2020

(54) EXTENSIBLE INPUT STACK FOR PROCESSING INPUT DEVICE DATA

(71) Applicant: Microsoft Technology Licensing, LLC, Redmond, WA (US)

(72) Inventors: Narasimhan Raghunath, Redmond, WA (US); Scott A. Greenlay, Redmond, WA (US); Francis Miland Hogle, IV, Seattle, WA (US); Fei Su, Issaquah, WA (US); Austin B. Hodges, Seattle, WA (US); Akhilesh Kaza, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/866,163

(22) Filed: Jan. 9, 2018

(65) Prior Publication Data

US 2019/0213016 A1    Jul. 11, 2019

(51) Int. Cl.
| | | |
|---|---|---|
| *G06F 9/4401* | (2018.01) |
| *G06F 13/10* | (2006.01) |
| *G06F 13/38* | (2006.01) |
| *G06F 3/06* | (2006.01) |
| *G06F 13/42* | (2006.01) |

(52) U.S. Cl.
CPC .......... *G06F 9/4411* (2013.01); *G06F 3/0601* (2013.01); *G06F 13/102* (2013.01); *G06F 13/385* (2013.01); *G06F 13/4226* (2013.01)

(58) Field of Classification Search
CPC .. G06F 9/4411; G06F 9/45533; G06F 13/102; G06F 13/126

USPC .......................................................... 710/2
See application file for complete search history.

(56) References Cited

U.S. PATENT DOCUMENTS

| | | |
|---|---|---|
| 5,931,935 A | 8/1999 | Cabrera et al. |
| 6,237,053 B1 | 5/2001 | Herrod et al. |
| 6,845,397 B1 | 1/2005 | Lavian et al. |
| 7,574,217 B1 * | 8/2009 | Leung .................. H04W 24/02 455/456.1 |

(Continued)

OTHER PUBLICATIONS

"International Search Report and Written Opinion Issued in PCT Application No. PCT/US18/066104", dated Mar. 25, 2019, 14 Pages.

(Continued)

*Primary Examiner* — Getente A Yimer
(74) *Attorney, Agent, or Firm* — Fiala & Weaver P.L.L.C.

(57) ABSTRACT

Methods, systems, and computer program products are described herein an extensible input stack for processing input device data received from a plurality of different input devices attached to a computing device. The extensible input stack comprises a plurality of stack layers. Each of the plurality of stack layers performs a particular set of processing with respect to the input device data, among other operations. Each of the plurality of stack layers comprises a code interface, which is used to provide and/or or receive data from the input device and/or other stack layers. Each of the stack layers is extensible to include additional functionality to support new input devices. By separating out the functionality performed by the input stack into separate stack layers, and having each layer accessible via a code interface, the functionality of each of stack layers may be easily extended to support any type of input device.

20 Claims, 9 Drawing Sheets

(56) References Cited

U.S. PATENT DOCUMENTS

| | | | |
|---|---|---|---|
| 8,745,300 B2* | 6/2014 | Kuo | H04N 17/002 710/310 |
| 2003/0227643 A1* | 12/2003 | Reddy | H04L 12/5692 358/1.13 |
| 2005/0052434 A1 | 3/2005 | Kolmykov-zotov et al. | |
| 2007/0043550 A1* | 2/2007 | Tzruya | G06F 9/452 703/24 |
| 2007/0294332 A1* | 12/2007 | Karki | G06F 8/60 709/203 |
| 2008/0001923 A1 | 1/2008 | Hall et al. | |
| 2008/0127228 A1 | 5/2008 | Durojaiye et al. | |
| 2009/0113458 A1* | 4/2009 | Finger | G06F 9/45533 719/327 |
| 2011/0191550 A1 | 8/2011 | Lee et al. | |
| 2013/0202055 A1* | 8/2013 | Caliguri | H04L 27/2647 375/260 |
| 2013/0297833 A1* | 11/2013 | Vadivelu | G06F 13/126 710/5 |
| 2014/0075458 A1 | 3/2014 | Wright et al. | |
| 2015/0331830 A1* | 11/2015 | Kumar | G06F 13/4282 710/11 |
| 2016/0062932 A1 | 3/2016 | Bhesania et al. | |
| 2019/0213015 A1 | 7/2019 | Raghunath et al. | |

OTHER PUBLICATIONS

Ilmonen, et al., "Software Architecture for Multimodal User Input—FLUID", In Proceedings of the User interfaces for all 7th international conference on Universal access: theoretical perspectives, practice, and experience, Oct. 24, 2002, 20 Pages.

"International Search Report and Written Opinion Issued in PCT Application No. PCT/US18/066102", dated Mar. 18, 2019, 14 Pages.

"Non Final Office Action Issued in U.S. Appl. No. 15/866,150", dated May 2, 2019, 38 Pages.

"Final Office Action Issued in U.S. Appl. No. 15/866,150", dated Nov. 7, 2019, 39 Pages.

* cited by examiner

EXTENSIBLE INPUT STACK FOR PROCESSING INPUT DEVICE DATA

BACKGROUND

In the current era, there numerous interfaces that enable intuitive and natural ways of human-computer communication. With the increase in computational developments and technical knowledge, the number and types of devices used to provide input to a computer has increased and will continue to do so as new concepts of interaction are developed. In the past, to support a new type of device, significant portions of the operating system (OS) had to be rewritten, sometimes taking several years of development time. However, the rate at which new types of input devices are being developed is increasing, thereby making the long OS development time less feasible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to an extensible input stack for processing input device data received from a plurality of different input devices attached to a computing device. The extensible input stack comprises a plurality of stack layers. Each layer of the stack performs a particular set of processing with respect to the input device data, among other operations. Each stack layer comprises an interface, which is used to provide and/or or receive data from the input device and/or other stack layers. Each stack layer is extensible to include additional functionality to support new input devices. By separating out the functionality performed by the input stack into separate stack layers, and having each layer accessible via an interface, the functionality of the input stack may be extended to support any type of input device (whether a past, present or future input device).

Further features and advantages of the embodiments disclosed herein, as well as the structure and operation of various embodiments, are described in detail below with reference to the accompanying drawings. It is noted that the subject matter described is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
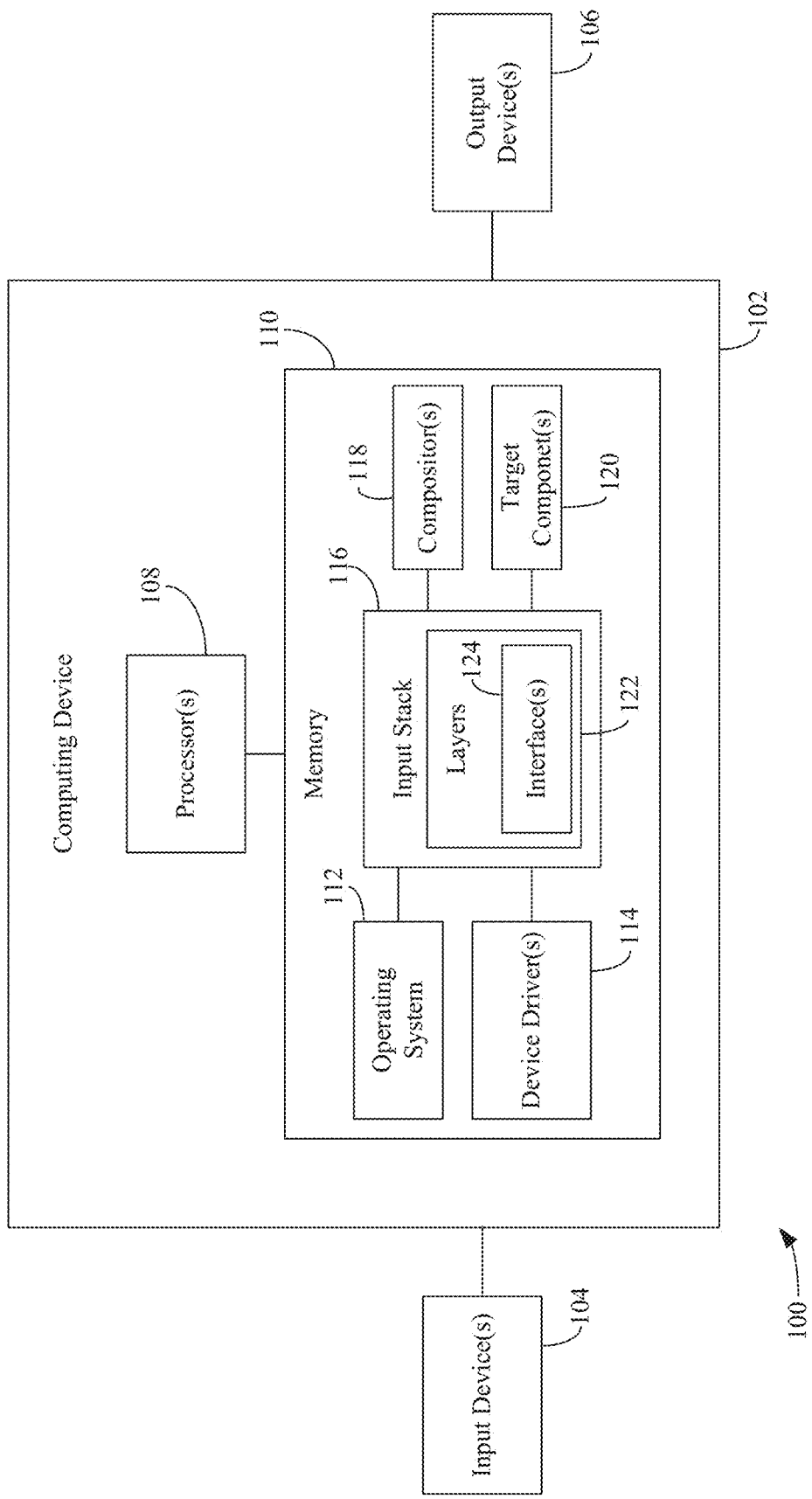
FIG. 1 shows a block diagram of an example system for implementing an extensible input stack in accordance with an embodiment.

The features and advantages of the present subject matter will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present subject matter. The scope of the present subject matter is not limited to the disclosed embodiments. The disclosed embodiments merely exemplify the present subject matter, and modified versions of the disclosed embodiments are also encompassed by the present subject matter. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The number and types of input devices to provide input to a computing device continues to increase as new concepts of interaction are developed. Prototyping and productizing new input devices can be a laborious process. To support a new type of input device, significant portions of the operating system (OS) often have to be rewritten. In some cases, a parallel input stack has to be built, or the new input device has to be built into an existing input stack through close cooperating between the input device developers and the OS team. Augmenting, modifying, or creating a new input type in an existing OS can lead to a new OS version. Writing kernel mode drivers and debugging crash dumps can consume much of the developer's time. In other cases, a third-party developer of a new input device has to develop and distribute a component to handle input from the new input device at the application level, requiring application developers to package the component as part of their applications.

Embodiments described herein are directed to an extensible input stack for processing input device data received from a plurality of different input devices attached to a computing device. The extensible input stack comprises a plurality of stack layers. Each of the stack layers performs a particular set of processing with respect to the input device data, among other operations. Each of the stack layers comprises an interface, which is used to provide and/or or receive data from the input device and/or other stack layers. Each of the stack layers is extensible to include additional functionality to support new input devices. By separating out the functionality performed by the input stack into separate stack layers, and having each layer accessible via an interface, the functionality of the input stack may be easily extended to support any type of input device (whether it be a past, present or future input device).

Each stack layer may be individually customized to support new functionality (e.g., functionality to process input data from a newly-developed input device not previously supported by the OS). Functionality for a particular stack layer may be extended by installing and dynamically loading a software component, such as an "add-on," "extension," or "plug-in" that incorporates the new functionality and interfaces with programming interface(s) of the particular stack layer.

A. Extensible Input Stack

Embodiments for extensible input stacks may be configured in various ways, in embodiments. For instance, FIG. 1 shows a block diagram of an example system 100 for implementing an extensible input stack, according to an example embodiment. As shown in FIG. 1, system 100 includes a computing device 102, one or more input devices 104, and one or more output devices 106. These features of system 100 are described in detail as follows.

Computing device 102 may comprise any of a wide variety of computing devices mentioned herein or otherwise known, including but not limited to a desktop computer, a tablet computer, a laptop computer, a smart phone, etc. However, these examples are not intended to be limiting and computing device 102 may include other types of devices other than those listed herein.

Input device(s) 104 comprise one or more devices that operate to generate input device data in response to a user's manipulation or control thereof. Such user input device data is passed via one or more device drivers 114 to computing device 102 for processing thereof. Depending upon the implementation, input device(s) 104 may include a touch screen (e.g., a touch screen integrated with output device(s) 106), a keyboard, a keypad, a mouse, a touch pad, a trackball, a joystick, a pointing stick, a wired glove, a motion tracking sensor, an eye-tracking device, a microphone, a game controller or gamepad, or a video capture device such as a camera. However, these examples are not intended to be limiting and input device(s) 104 may include other types of devices other than those listed herein, including yet-to-be-developed input device types. Depending upon the implementation, input device(s) 104 may be integrated within the same physical structure or housing of computing device 102 (such as an integrated touch screen, touch pad, or keyboard on a computing device) or physically separate from a physical structure or housing of computing device 102 and connected thereto via a suitable wired and/or wireless connection.

Output device(s) 106 comprise one or more devices to which content, such as text, video, and images, can be rendered so that it will be visible to a user of computing device 102. Depending upon the implementation of computing device 102, output device(s) 106 may comprise a device that is integrated within the same physical structure or housing of computing device 102 and/or input device(s) 104 or may be device(s) that are physically separate from a structure or housing of computing device 102 and/or input device(s) 104 and connected thereto via a suitable wired and/or wireless connection.

As further shown in FIG. 1, computing device 102 comprises one or more processor(s) 108 and a memory 110. Processor(s) 108 are intended to represent one or more microprocessors, each of which may have one or more central processing units (CPUs) or microprocessor cores. Processor(s) 108 operate in a well-known manner to execute computer programs (also referred to herein as computer program logic). The execution of such computer programs causes processor(s) 108 to perform operations including operations that will be described herein. Each of memory 110, input device(s) 104, and output device(s) 106 are connected to processor(s) 108 via one or more suitable interfaces.

Memory 110 comprises one or more computer-readable memory devices that operate to store computer programs and data. Memory 110 may be implemented using any of a wide variety of hardware-based, volatile computer-readable memory devices including, but not limited to, random access memory (RAM) devices and/or non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives.

As shown further shown in FIG. 1, memory 110 stores an operating system 112, device driver(s) 114, an input stack 116, one or more compositor(s) 118, and one or more target components 120 maintained by operating system 112 to which input device data is to be provided. Operating system 112 may manage one or more hardware components (e.g., processor(s) 108, main memory 110, input device(s) 104 and/or output device(s) 106) and/or software components installed and/or executing on computing device 102, for example, device driver(s) 114, input stack 116, compositor(s) 118, and/or target component(s) 120. It is noted that while FIG. 1 depicts device driver(s) 114, input stack 116, compositor(s) 118 and target component(s) 120 as being separate components from operating system 112, device driver(s) 114, input stack 116, compositor(s) 118, and/or target component(s) 120 may be integrated as part of operating system 112.

Device driver(s) 114 are software applications that are configured to interface input device(s) 104 with operating system 112. In particular, device driver(s) 114 provide data generated from corresponding input device(s) 104 (and that is in an input device-specific format used by input device(s) 104) to operating system 112. In certain implementations, device driver(s) 114 may translate the data generated by input device(s) 112 into a format that is compatible with operating system 112. Each of device driver(s) 114 may also implement one or more function(s) (also referred to as "routine(s)") that contain code specific to corresponding input device(s) 104. Each of the function(s), when called, for example by operating system 112, cause input device(s) 104 to carry out one or more actions corresponding to the function(s). Device driver(s) 114 may be developed and supplied by the developer of input device(s) 104, or alternatively, may be developed and supplied by the developer of operating system 112.

The data provided to operating system 112 may comprise input device data generated by input device(s) 104. The input device data may be provided to input stack 116 for further processing. The input device data may indicate particular events that occur with respect to input device(s) 104, such as events that indicate that input device(s) 104 have been attached to or removed from computing device 102, events that indicate that a particular user interface element (e.g., a button, a key, touch screen, microphone, other known or yet-to-be-developed input element, etc.) of the input device(s) 104 has been interacted with, etc.

Input stack 116 processes input device data generated by input device(s) 104. Input stack 116 comprises a plurality of stack layers 122. Each layer of plurality of stack layers 122 is configured to perform a corresponding designated set of operations with respect to the input device data. For example, a first layer of plurality of stack layers 122 may be configured to convert the input device data into a format suitable for handling by other layers of plurality of stack layers 122. A second layer of plurality of stack layers 122 may determine a type of the input device data (e.g., spatial input or non-spatial input data, touch input or non-touch input data, etc.). For example, the second layer may communicate with compositor(s) 118 to determine which target component(s) 120 a user is interacting with via input device(s) 104. Examples of target component(s) 120 include, but are not limited to, a software application, a shell, or a service executing on computing device 102 and maintained by operating system 112.

Compositor(s) 118 may include processes that compose/render windows, icons, buttons, or other display objects that are associated with target component(s) 120 or operating system 112 and that are rendered on a display device (e.g., output device(s) 106) coupled to computing device 102. Compositor(s) 118 may determine the target component that a user is interacting with based on the display object being interacted by the user via input device(s) 104. Example of compositor(s) 118 include, but are not limited to the Direct Composition compositor and Desktop Windows Manager, both provided by Microsoft Corporation®.

In another example, a third layer of plurality of stack layers 122 may determine a target component (e.g., target component(s) 120) maintained by operating system 112 to which the input device data is to be provided. In still another example, a fourth layer of plurality of stack layers 122 may determine a format in which the input device data is to be provided to the determined target component and convert the input device data into the determined format. In yet a further example, a fifth layer of the plurality of stack layers 122 may provide the formatted input device data to target component(s) 120). Any number, combination, and variety of types of stack layers may be included in stack layers 122, in embodiments.

The input device data may be passed from device driver(s) 114 to input stack 116 and/or between each layer of plurality of stack layers 122 via interface(s) 124. For example, each layer of plurality of stack layers 122 may be associated with a particular interface of interface(s) 124 that is configured to receive input device data from device driver(s) 114 or receive and/or provide data (such as input device data) to and/or from another layer of plurality of layers stack 122. In accordance with an embodiment, one or more of interface(s) 124 is an application programming interface (API). In other embodiments, one or more of interface(s) 124 may be another type of programming interface.

By separating out the functionality performed by input stack 116 into separate stack layers, and having each layer accessible (e.g., invokable) via an interface (e.g., interface(s) 124), the functionality of each of plurality of stack layers 122 may be easily extended to support any type of input device (whether it be a past, present or future input device), thereby making input stack 116 extensible. Each stack layer may be individually customized to support new functionality (e.g., functionality to process input data from a newly-developed input device not previously supported by operating system 112). Functionality for a particular stack layer may be extended by installing and loading a software component, such as an "add-on," "extension," or "plug-in" that incorporates the new functionality and interfaces with interface(s) 124 for the particular layer. In some implementations, only a subset of stack layers may be extended with new functionality, while the remaining layers may be reused without making any modifications thereto, thereby minimizing the amount of modifications required for input stack 116 to support the particular input device.

Figure 2:
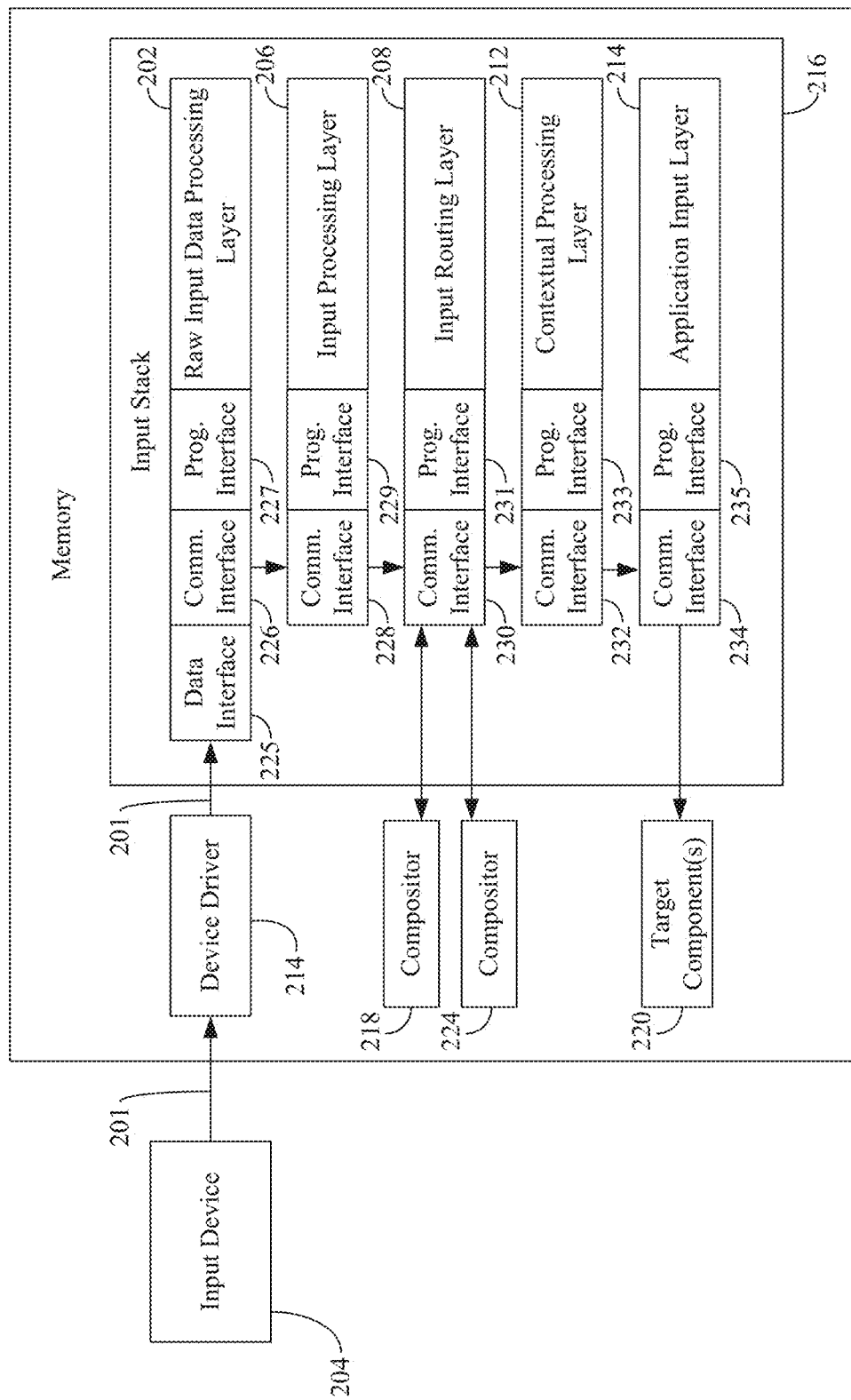
FIG. 2 shows a block diagram of an example input stack in memory in communication with an input device, in accordance with an embodiment.

As mentioned above, stack layers 122 may be configured in various ways. For instance, FIG. 2 shows a block diagram of an example input stack 216, according to an example embodiment. As shown in FIG. 2, input stack 216 is stored in a memory 210. Input stack 216 is communicatively coupled to a device driver 214, an input device 204 (via device driver 214), a first compositor 218, a second compositor 224, and one or target component(s) 220. Input stack 216, memory 210, device driver 214, and target component (s) 220 are examples of input stack 116, memory 110, device driver(s) 114, and target component (s) 120, as described above with reference to FIG. 1. First compositor 218 and second compositor 224 are examples of compositor(s) 118, as described above with reference to FIG. 1. As further shown in FIG. 2, input stack 216 comprises a raw input data processing layer 202, an input processing layer 206, an input routing layer 208, a contextual processing layer 212, and an application input layer 214. Raw input data processing layer 202 comprises a data interface 225, first communication interface 226, and a first programming interface 227. Input processing layer 206 comprises a second communication interface 228 and a second programming interface 229. Input routing layer 208 comprises a third communication interface 230 and a third programming interface 231. Contextual processing layer 212 comprises a fourth communication interface 232 and a fourth programming interface 233. Application input layer 214 comprises a fifth communication interface 234 and a fourth programming interface 235. Each of raw input data processing layer 202, input processing layer 206, input routing layer 208, contextual processing layer 212, and application input layer 214 are an example layer of stack layers 122, described above with reference to FIG. 1. Each of data interface 225, first communication interface 226, first programming interface 227, second communication interface 228, second programming interface 229, third communication interface 230, third programming interface 231, fourth communication interface 232, fourth programming interface 233, fifth communication interface 234, and fifth programming interface 235 is an example of interface(s) 124, as described above with reference to FIG. 1. These features of FIG. 2 are described in detail as follows.

Raw input data processing layer 202 is configured to receive input device data 201 generated by input device 204 via device driver 214, which provides input device data 201 to data interface 225. Input device data 201 may comprise a payload that indicates particular events that occur with respect to input device 204, such as events that indicate that input device 204 has been attached to or removed from a computing device in which input stack 216 is included (e.g., computing device 102, as shown in FIG. 1), events that indicate that a particular user interface element (e.g., a button, a key, etc.) of input device 204 has been interacted with, etc. Raw input data processing layer 202 is configured to convert input device data 201 to a format suitable for handling by input processing layer 206, input routing layer 208 and contextual processing layer 212, thereby enabling different input devices with different input device types to be handled by input stack 216 via a common device data format. First communication interface 226 provides the converted input device data to second communication interface 228 of input processing layer 206. For example, first communication interface 226 of raw input data processing layer 202 may issue an API call comprising the converted input device data to second communication interface 228.

Input processing layer 206 is configured to receive the converted input device data via second communication interface 228. Input processing layer 206 is configured to determine whether the converted input device data is at least one of spatial input data or non-spatial input data. For example, input device 204 may provide an identifier in a header of the input device data that specifies the type of data included in the payload (e.g., spatial input data or non-spatial input data). Spatial input data is data that is routed to a target component (e.g., target component(s) 220) based on a hit test, where position information (e.g., x and y coordinates) included in the payload of the input device data is used to determine which display object is being interacted with by the user via input device 204. Input devices that may be classified as spatial input devices include, but are not limited to, a mouse, a touch screen, a stylus, a touchpad and/or the like. Non-spatial input data is data that is routed to a target component that is currently in focus (e.g., an application currently being used by the user or in which its window has focus). Input devices that may be classified as non-spatial input devices include, but are not limited to, a keyboard, a gamepad and/or the like. It is noted that in particular implementations, an input device may be configured to provide both spatial input data and non-spatial input data. Second communication interface 228 provides the converted input device data and/or the identifier specifying whether input device 204 is a spatial device or a non-spatial device to third communication interface 230. For example, second communication interface 228 of input processing layer 206 may issue an API call comprising the converted input device data and/or the identifier to third communication interface 230 of input routing layer 208.

Input routing layer 208 is configured to receive the converted input device data and/or the identifier via third communication interface 230. Input routing layer 208 is configured to determine target component(s) 220 to which the converted input device data is to be provided based on whether the converted input device data is spatial input data or non-spatial input data. For example, if the converted input device data is spatial input data, input routing layer 208 may provide particular data included in the converted input device data to a compositor configured to perform a hit test (e.g., first compositor 218). Such data includes, but is not limited to, requests to perform a hit test and/or position information. First compositor 218 may use such data to perform a hit test to determine which display object is being interacted with by the user via input device 204 and determine target component(s) 220 associated with that display object. After determining target component(s) 220, first compositor 218 may provide a response to input routing layer 208 specifying target component(s) 220 to which the converted input device data is to be provided. An example of first compositor 218 includes, but is not limited to, the Direct Composition compositor by Microsoft Corporation®. If the converted input device data is non-spatial input data, input routing layer 208 may provide particular data included in the converted input device data (e.g., focus change notifications) to a compositor configured to process such notifications (e.g., second compositor 224). Second compositor 224 may process the focus change notifications to determine which target component(s) 220 are being interacted with by the user via input device 204. Second compositor 224 may provide a response to input routing layer 208 specifying target component(s) 220 to which the converted input device data is to be provided. An example of second compositor 224 includes, but is not limited to, the Desktop Windows Manager by Microsoft Corporation®. Third communication interface 230 provides the converted input device data and/or an identifier specifying target component(s) 220 to which the converted input device is to be provided to fourth communication interface 232 of contextual processing layer 212. For example, third communication interface 230 of input routing layer 208 may issue an API call comprising the converted input device data and/or the identifier to fourth communication interface 232 of contextual processing layer 212.

Contextual processing layer 212 is configured to receive the converted input device data and/or the identifier specifying target component(s) 220 via fourth communication interface 232. Contextual processing layer 212 is configured to determine a format in which the converted input device data is to be provided to determined target component(s) 220 and convert the converted input device data into that format. For example, context processing layer 212 may query determined target component(s) 220 to determine the format supported thereby. For instance, target component(s) 220 may specify that they support a format used to provide input device data from a mouse. If the converted input device data received by contextual processing layer 212 is in a format used by a different type of input device (e.g., virtual reality eyeglasses, such as the HoloLens™ provided by Microsoft Corporation® or a dial device, such as the Surface Dial™ by Microsoft Corporation®), contextual processing layer 212 converts the converted input device data into the format supported by target component(s) 220 (e.g., the input device data provided by the other type of device (e.g., a HoloLens™ or Dial™) is converted into mouse input device data, thereby enabling the converted input device data to be utilized by target component(s) 220. Fourth communication interface 232 provides the formatted input device data and/or the identifier specifying target component(s) 220 to fifth communication interface 234 of application input layer 214. For example, fourth communication interface 232 of contextual processing layer 212 may issue an API call comprising the formatted input device data and/or the identifier to fifth communication interface 234 of application input layer 212.

Application input layer 214 is configured to receive the formatted input device data and/or the identifier specifying target component(s) 220 via fifth communication interface 234 and provide the formatted input device data to target component(s) 220 specified by the identifier. For example, fifth communication interface 234 may call one or more APIs that target component(s) 220 use to receive and/or process the formatted input device data. For instance, in a scenario in which the formatted input device data is representative of a user clicking a particular button of a mouse device, the API called by fifth communication interface 234 may communicate an event to target component(s) 220 that specifies that the user has clicked the button on the mouse device.

Each of programming interfaces 227, 229, 231, 233, and 235 may be used to extend the functionality of its associated stack layer. For example, first programming interface 227 may be used to extend the functionality of raw input data processing layer 202, second programming interface 229 may be used to extend the functionality of input processing layer 206, third programming interface 231 may be used to extend the functionality of input routing layer 208, fourth programming interface 233 may be used to extend the functionality of contextual processing layer 212, fifth programming interface 235 may be used to extend the functionality of application input layer 214.

Functionality for a particular stack layer may be extended by installing and/or loading a software component, such as an "add-on," "extension," or "plug-in" (which may be implemented as a dynamic link library (DLL) that incorporates the new functionality and interfaces with the programming interface(s) of the particular layer.

For example, a developer may extend the functionality of raw input data processing layer 202 to support a new type of input device that generates data in accordance with a device-specific protocol previously not supported by raw input data processing layer 202. In particular, a software component may be installed and/or loaded via programming interface 227 that causes raw input data processing layer 202 to support such functionality.

In another example, a developer may extend the functionality of input processing layer 206 to support new types of data (e.g., other than spatial and/or non-spatial input data). In particular, a software component may be installed and/or loaded via programming interface 229 that causes input processing layer 206 to support such functionality.

In yet another example, a developer may extend the functionality of input routing layer 208 to support additional routing policies. For instance, one policy may specify that input device data determined to be spatial input data (or some other type of data) is to be routed to a compositor that determines a target component to which the input device is to be provided based on processing focus notifications (as opposed to performing a hit test). Another policy may specify that input device data determined to be non-spatial input data (or some other type of data) is to be routed to a compositor that determines a target component to which the input device data is to be provided based on a hit test (as opposed to processing focus notifications). In particular, a software component may be installed and/or loaded via programming interface 231 that causes input routing layer 208 to support the functionality described above.

In still another example, a developer may extend the functionality of contextual processing layer 212 to support new formats in which the input device can be formatted. In particular, a software component may be installed and/or loaded via programming interface 233 that causes contextual processing layer 212 to support such functionality.

In a further example, a developer may extend the functionality of application input layer 214 to support new and/or custom input events that are to be provided to a target component. The new and/or custom input events may be for new types of devices not previously supported by input stack 216. In particular, a software component may be installed and/or loaded via programming interface 235 that causes application input layer 214 to support such functionality.

In accordance with an embodiment, each of programming interface(s) 227, 229, 231, 233, and 235 are APIs.

By organizing input stack 216 and processing the input device data in the manner described above, new types of input devices may be supported by operating system 112 and input stack 216 without having to rewrite significant portions thereof. That is, significant portions of input stack 216 are reusable, thereby minimizing the development time to support such new devices. For example, in the example provided above, a developer may simply extend the functionality of raw input data processing layer 202 (via a software component installed and/or loaded via programming interface 227) in order to support the new type of input device data generated by such new devices. The functionality of the other layers may not need to be extended (via software components installed and/or loaded via programming interfaces 229, 231, 233, 235) due to raw input data processing layer 202 converting the new type of input device data into a known format suitable for processing by the other layers. It is noted that the foregoing is just one example for extending the functionality of input stack 216 and that in other implementations, the functionality of one or more other layers may be extended.

Figure 3:
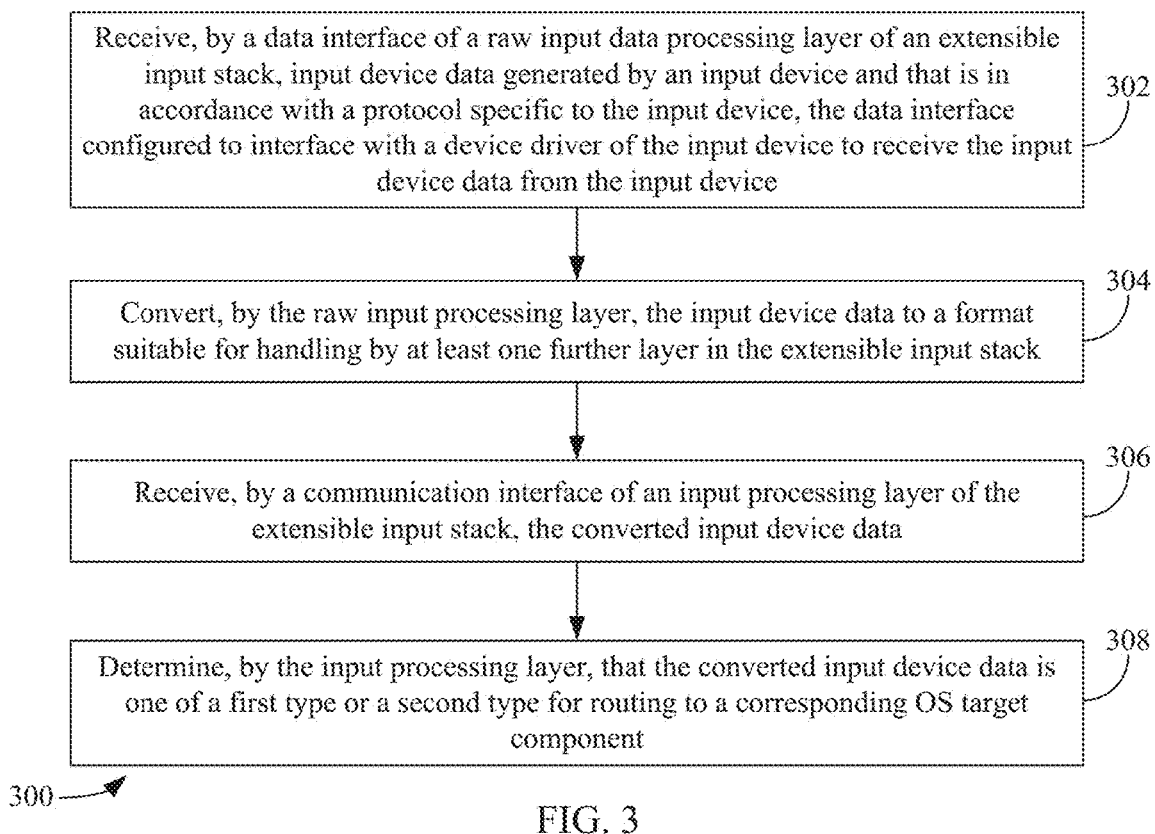
FIG. 3 shows a flowchart for processing input device data by an input stack containing a raw input data processing layer and an input processing layer, in accordance with an embodiment.
Figure 4:
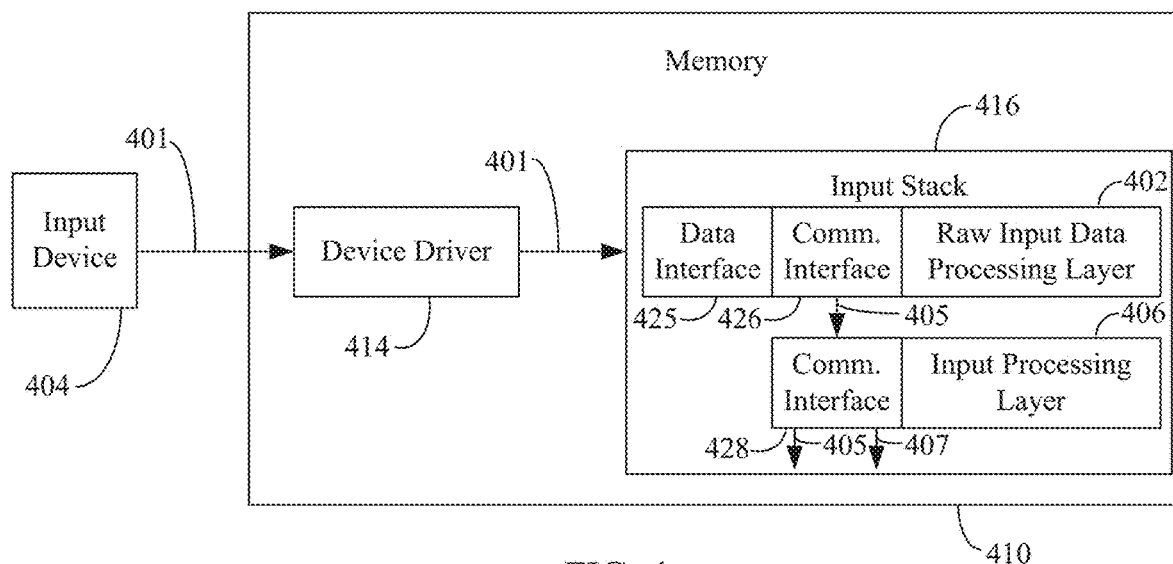
FIG. 4 shows a block diagram of example input stack, according to an example embodiment.

Accordingly, an input stack may process input device data in many ways. For example, FIG. 3 shows a flowchart 300 for processing input device data by an input stack that contains a raw input data processing layer and an input processing layer, in accordance with an embodiment. In an embodiment, flowchart 300 may be implemented by an input stack 416 shown in FIG. 4. FIG. 4 shows a block diagram of input stack 416, according to an example embodiment. As shown in FIG. 4, input stack 416 is stored in a memory 410. Input stack 416 is communicatively coupled to an input device 404 and a device driver 414. Input stack 416, memory 410, and device driver 414 are examples of input stack 216, memory device 210, and device driver 214, as described above with reference to FIG. 2. As further shown in FIG. 2, input stack 416 comprises a raw input data processing layer 402 and an input processing layer 406. In further embodiments, input stack 416 may include additional layers described elsewhere herein. As shown in FIG.

4, raw input data processing layer 402 comprises a data interface 425 and a first communication interface 426, and input processing layer 406 comprises a second communication interface 428. Raw input data processing layer 402 and input processing layer 406 are examples of raw input data processing layer 202 and input processing layer 206, respectively, as described above with reference to FIG. 2. Data interface 425, first communication interface 426 and second communication interface 428 are examples of data interface 225, first communication interface 226 and second communication interface 228, respectively, as described above with reference to FIG. 2.

Flowchart 300 begins with step 302. In step 302, a data interface of a raw input data processing layer of an extensible input stack receives input device data generated by an input device and that is in accordance with a protocol specific to the an input device. The data interface is configured to interface with a device driver of the input device to receive the input device data from the input device. For example, with reference to FIG. 4, data interface 425 of raw input data processing layer 402 receives input device data 401 from input device 404 via device driver 414.

At step 304, the raw input data processing layer converts the input device data to a format suitable for handling by at least one further layer in the extensible input stack. For example, with reference to FIG. 3, raw input data processing layer 402 converts input device data 401 to a format suitable for handling by at least one further layer in input stack 416. The converted input device data is shown as converted input device data 405 in FIG. 4. Raw input data processing layer 402 may use any suitable technique to convert input device data 401 into converted input device data 405. For instance, raw input data processing layer 402 may utilize a data format map to map input device data 401 to the format suitable for the at least other layer of input stack 416.

At step 306, a communication interface of an input processing layer of the extensible input stack receives the converted input device data. For example, with reference to FIG. 4, second communication interface 428 of input processing layer 406 receives converted input device data 405 via first communication interface 426 of raw input data processing layer 402.

At step 308, the input processing layer determines that the converted input device data is one of a first type or a second type for routing to a corresponding operating system (OS) target component. For example, with reference to FIG. 4, input processing layer 406 determines that converted input device data 405 is one of a first type or a second type for routing to a corresponding OS target component. For instance, converted input device data 405 may comprise a header that specifies the type of data included in the payload of the input device data (e.g., spatial input data or non-spatial input data). Second communication interface 428 may provide converted input device data 405 to another stack layer (e.g., an input routing layer, as described below with reference to FIGS. 5 and 6). Second communication interface 428 may also provide an identifier 407 that specifies whether converted input device data 405 is a first type or a second type.

In accordance with one or more embodiments, the first type is spatial input data and the second type is non-spatial input data. In other embodiments, the input device data may be categorized in other ways, and/or into any number of categories/types.

Figure 5:
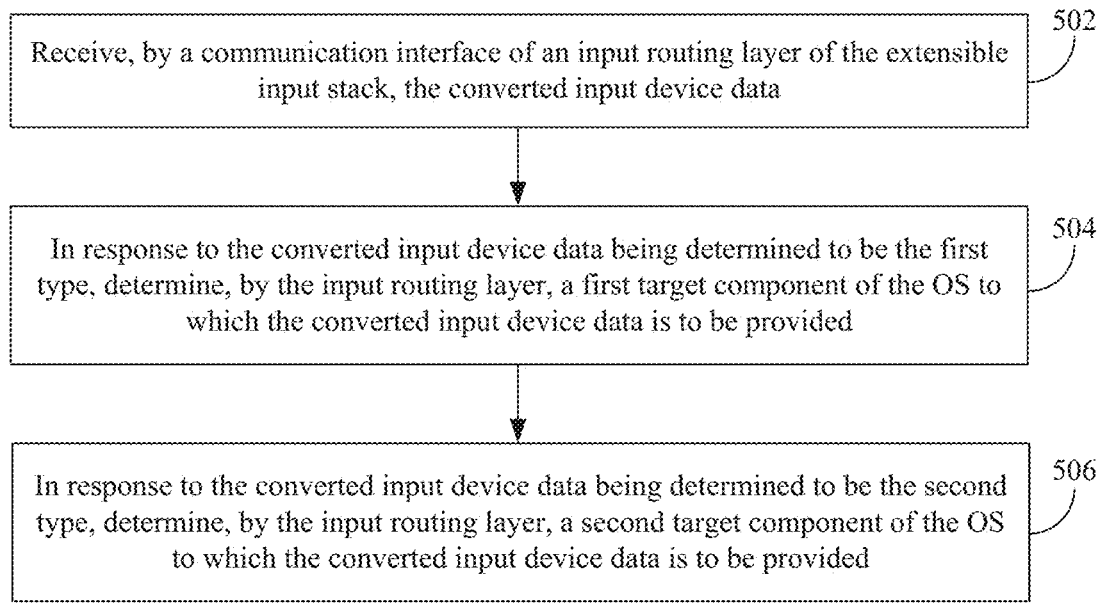
FIG. 5 shows a flowchart for processing input device data by an input stack containing an input routing layer, according to an example embodiment.
Figure 6:
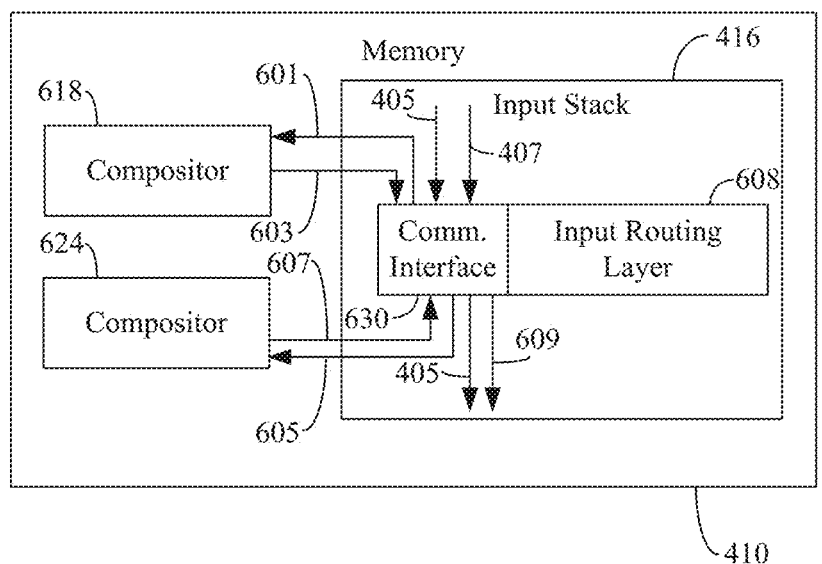
FIG. 6 shows a block diagram of example input stack, according to an example embodiment.

Further layers may be included in stack 416 of FIG. 4, in embodiments. For instance, FIG. 5 shows a flowchart 500 for processing input device data by an input routing layer of an input stack in accordance with an embodiment. In an embodiment, flowchart 500 may be implemented by input stack 416. For example, FIG. 6 shows a block diagram of a further portion of input stack 416, according to an example embodiment. As shown in FIG. 6 input stack 416 further comprises an input routing layer 608. Raw input data processing layer 402 and input processing layer 406 (as described above with reference to FIG. 4) are not shown in FIG. 5 for reasons of brevity. As shown in FIG. 6, input routing layer 608 comprises a third communication interface 630. Input routing layer 608 is an example of input routing layer 208, as described above with reference to FIG. 2. Third communication interface 630 is an example of third communication interface 230, as described above with reference to FIG. 2. As also shown in FIG. 6, input routing layer 608 is communicatively coupled to a first compositor 618 and a second compositor 624. First compositor 618 and second compositor 624 are examples of first compositor 218 and second compositor 224, respectively, as described above with reference to FIG. 2.

Flowchart 500 begins with step 502. In step 502, a communication interface of an input routing layer of the extensible input stack receives the converted input device data. For example, with reference to FIG. 6, third communication interface 630 receives converted input device data 405 (e.g., from second communication interface 428 of input processing layer 406, as shown in FIG. 4). As further shown in FIG. 6, third communication interface 630 may also receive identifier 407.

In step 504, in response to the converted input device data being determined to be the first type, the input routing layer determines a first target component of the operating system to which the converted input device data is to be provided. For example, with reference to FIG. 6, input routing layer 608 determines a first target component of the operating system (e.g., operating system 112, as described above with reference to FIG. 1) to which converted input device data 405 is to be provided.

In accordance with one or more embodiments, to determine the first target component, the input routing layer provides a hit test request included in the converted input device data to a first compositor of the OS. The input routing layer receives a first response from the first compositor that specifies the first target component. For example, with reference to FIG. 6, after determining that converted input device data 405 is a first type (e.g., using identifier 407), input routing layer 608 provides a hit test request 601 included in converted input device data 405 to a compositor configured to handle hit requests (e.g., first compositor 618). First compositor 618 conducts the hit request and provides a first response 603 to third communication interface 630. First response 603 specifies the target component determined by first compositor 608 via the hit test. Input routing layer 608 receives first response 603 via third communication interface 630 and determines the first target component based on a first response 603.

In step 506, in response to the converted input device data being determined to be the second type, the input routing layer determines a second target component of the operating system to which the converted input device data is to be provided. For example, with reference to FIG. 6, input routing layer 608 determines a second target component of the operating system to which converted input device data 405 is to be provided.

In accordance with one or more embodiments, to determine the second target component, the input routing layer provides at least one focus change notification included in the converted input device data to a second compositor of the OS and receives a first response from the second compositor that specifies the second target component. For example, with reference to FIG. 6, after determining that converted input device data 405 is a second type (e.g., using identifier 407), input routing layer 608 provides at least one focus change notification 605 included in converted input device data 405 to a compositor configured to handle focus change notifications (e.g., second compositor 624). Second compositor 624 processes the focus change notification(s) and provides a second response 607 to third communication interface 630. Second response 607 specifies the target component that is determined by second compositor 608 by processing the focus change notification(s). Input routing layer 608 receives second response 607 via third communication interface 630 and determines the second target component based on a second response 607. Third communication interface 630 may provide converted input device 403 to another stack layer (e.g., a contextual processing layer, as described below with reference to FIGS. 7 and 8). Third communication interface 630 may also provide an identifier 609 that specifies the target component (e.g., the first target component or the second component) to which converted input device data 405 is to be provided.

Figure 7:
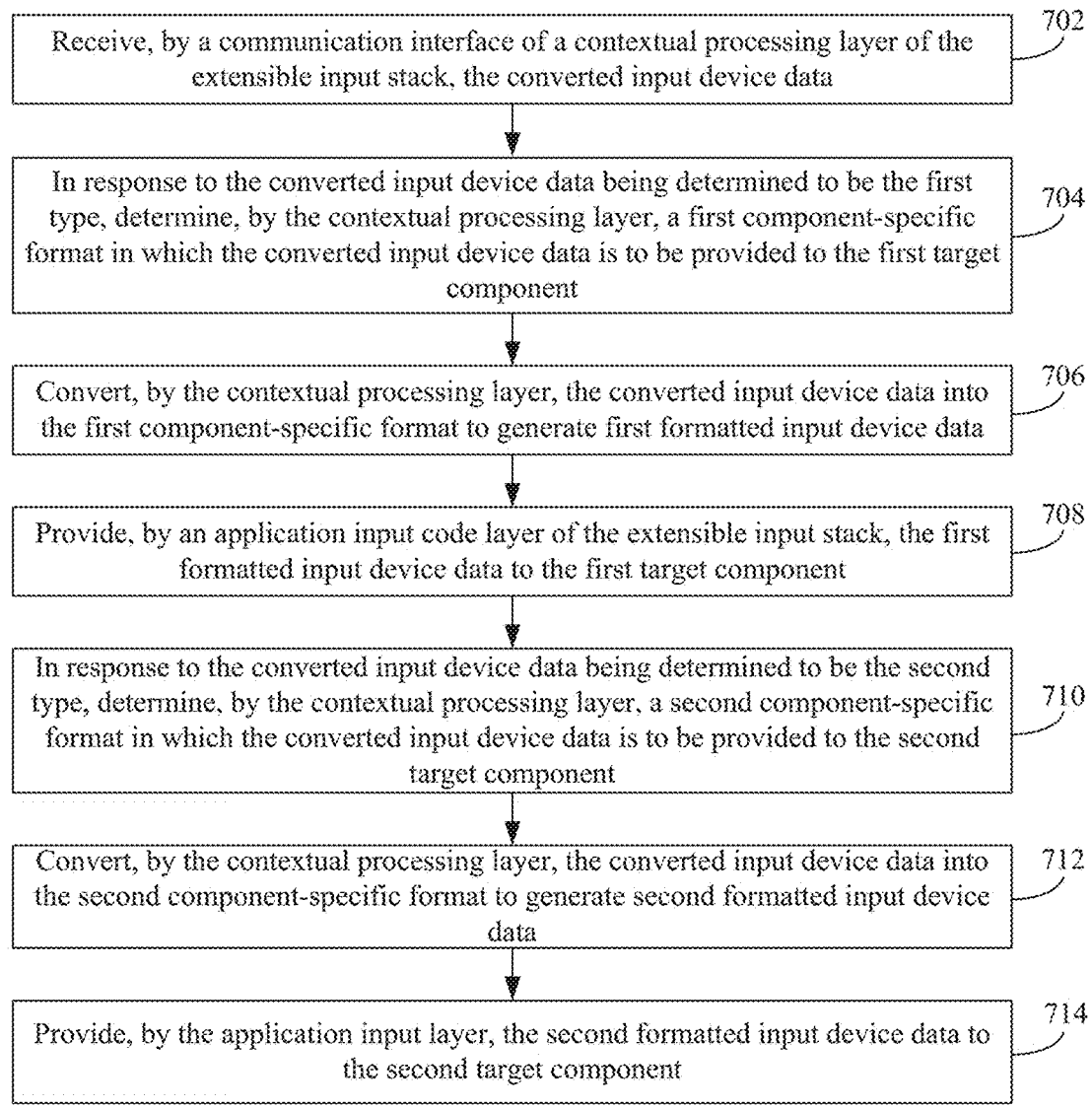
FIG. 7 shows a flowchart for processing input device data by an input stack containing a contextual processing layer and an application input layer, according to another example embodiment.
Figure 8:
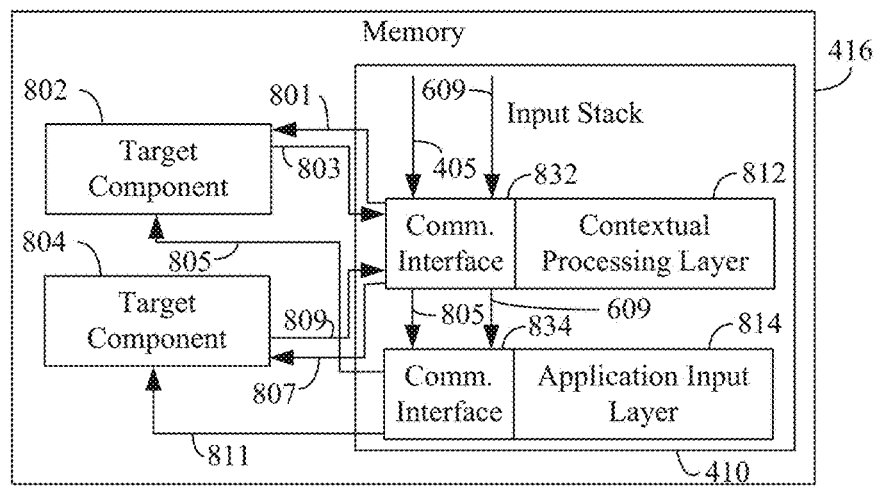
FIG. 8 shows a block diagram of example input stack containing a contextual routing layer, according to an example embodiment.

FIG. 7 shows a flowchart 700 for processing input device data by a contextual routing layer and an application input layer of an input stack in accordance with an embodiment. In an embodiment, flowchart 700 may be implemented by input stack 416. For instance, FIG. 8 shows a block diagram of a further portion of input stack 416, according to an example embodiment. As shown in FIG. 8 input stack 416 further comprises a contextual processing layer 812 and an application input layer 814. Raw input data processing layer 402, input processing layer 406, and input routing layer 608 (as described above with reference to FIGS. 4 and 6) are not shown for brevity. As further shown in FIG. 8, contextual processing layer 812 comprises a fourth communication interface 832, and application input layer 814 comprises a fifth communication interface 834. Contextual processing layer 812 is an example of contextual processing layer 212, and application input layer 814 is an example of application input layer 214, as described above with reference to FIG. 2. Fourth communication interface 832 is an example of fourth communication interface 232, and fifth communication interface 834 is an example of fifth communication interface 234, as described above with reference to FIG. 2. As also shown in FIG. 8, application input layer 814 is communicatively coupled to a first target component 802 and a second target component 804. First target component 802 and second target component 804 are examples of target component(s) 220, as described above with reference to FIG. 2.

Flowchart 700 begins with step 702. In step 702, a communication interface of a contextual processing layer of the extensible input stack receives the converted input device data. For example, with reference to FIG. 8, fourth communication interface 832 of contextual processing layer 812 receives converted input device data 405 (e.g., from third communication interface 630 of input routing layer 608, as shown in FIG. 6). As further shown in FIG. 8, fourth communication interface 832 may also receive identifier 609.

In step 704, in response to the converted input device data being determined to be the first type, the contextual processing layer determines a first component-specific format in which the converted input device data is to be provided to the first target component. For example, with reference to FIG. 8, contextual processing layer 812 determines a first component-specific format to which the converted input device is to be provided the first target component. For instance, contextual processing layer 812 may determine the target component based on identifier 609 and provide a query 801 to the target component (e.g., first target component 802). First target component 802 may provide a response 803 to fourth communication interface 832 that specifies one or more formats supported by first target component 802.

In step 706, the contextual processing layer converts the converted input device data into the first component-specific format to generate first formatted input device data. For example, with reference to FIG. 8, contextual processing layer 812 converts converted input device data 405 into the first component-specific format specified by response 803 to generate formatted input device data (shown as formatted input device data 805 in FIG. 8). Fourth communication interface 832 may provide formatted input device data 805 and/or identifier 609 to application input layer 814 via communication interface 834.

In step 708, an application input layer of the extensible input stack provides the first formatted input device data to the first target component. For example, with reference to FIG. 8, fifth communication interface 805 of application input layer 814 provides first formatted input device data 805 to first target component 802 (as specified by identifier 609).

In step 710, in response to the converted input device data being determined to be the second type, the contextual processing layer determines a second component-specific format in which the converted input device data is to be provided to the second target component. For example, with reference to FIG. 8, contextual processing layer 812 determines a second component-specific format to which the converted input device is to be provided the second target component. For instance, contextual processing layer 812 may determine the target component based on identifier 609 and provide a query 807 to the target component (e.g., second target component 804). Second target component 804 may provide a response 809 to fourth communication interface 832 that specifies one or more formats supported by second target component 804.

In step 712, the contextual processing layer converts the converted input device data into the second component-specific format to generate second formatted input device data. For example, with reference to FIG. 8, contextual processing layer 812 converts converted input device data 405 into the second component-specific format specified by response 809 to generate formatted input device data (shown as second formatted input device data 811 in FIG. 8). Fourth communication interface 832 may provide formatted input device data 805 and/or identifier 609 to application input layer 814 via communication interface 834.

In step 714, the application input layer provides the second formatted input device data to the second target component. FIG. 8, fifth communication interface 805 of application input layer 814 provides second formatted input device data 811 to second target component 804 (as specified by identifier 609).

In accordance with an embodiment, at least one of the first target component or the second target component is one of an application, a shell, or a service maintained by the operating system.

B. Dynamic Loading of Software Component(s)

Figure 9:
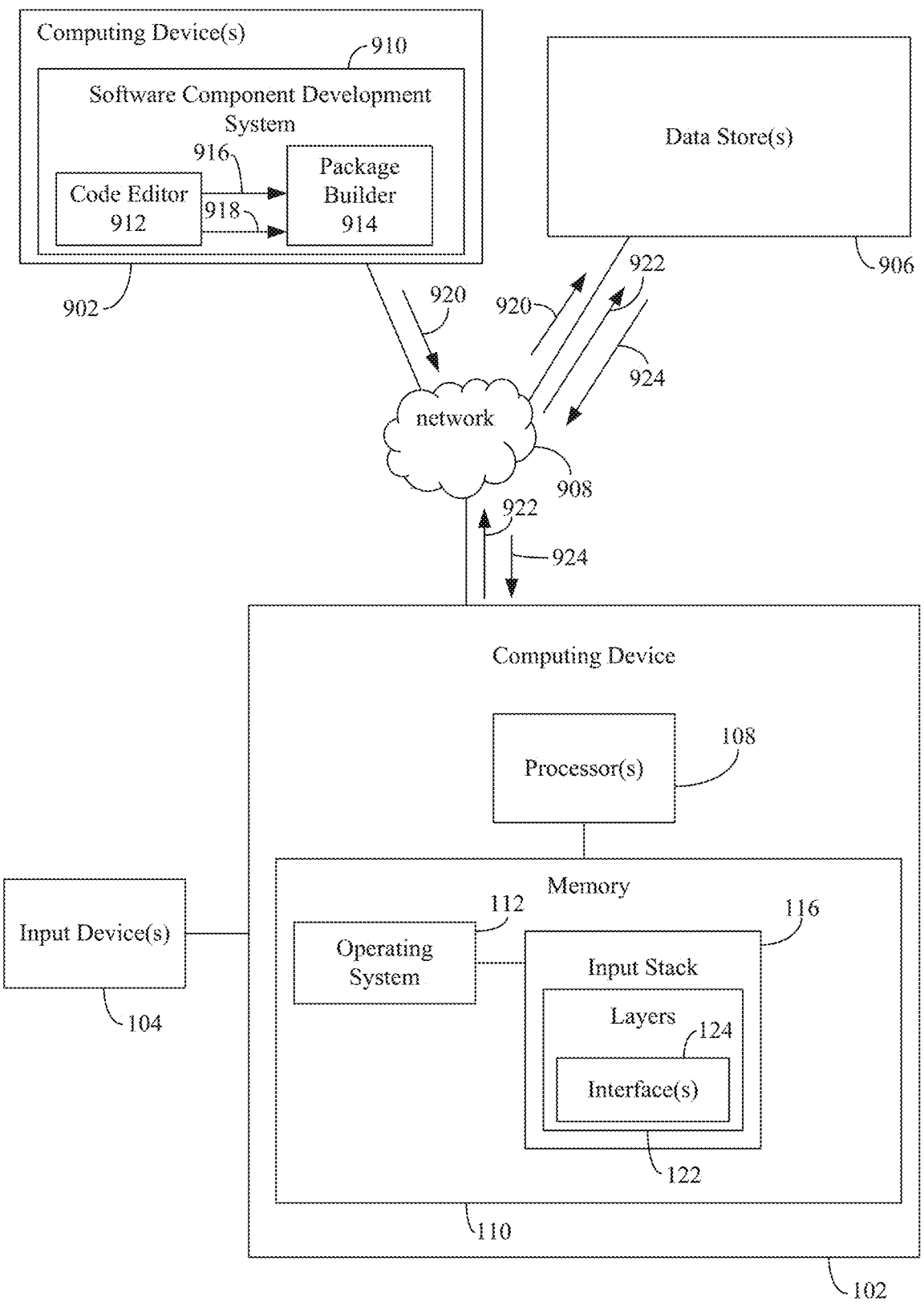
FIG. 9 shows a block diagram of a system for dynamically loading software components to extend functionality of an input stack, according to an example embodiment.

FIG. 9 shows a block diagram of a system 900 for dynamically loading software components to extend functionality of an input stack, according to an example embodiment. As shown in FIG. 9, system 900 includes computing device 902, a computing device 102 (as described above with reference to FIG. 1), and one or more data stores 906. Computing device 902, computing device 102, and data store(s) 906 may be communicatively connected via a network 908. Network 908 may comprise one or more networks such as local area networks (LANs), wide area networks (WANs), enterprise networks, the Internet, etc., and may include one or more of wired and/or wireless portions.

Computing device 902 may include a software component development system 910, which may be used by a developer to develop software components (e.g., "add-on," "extension," or "plug-in") that are configured to extend the functionality of an input stack (e.g., input stack 916). For example, software component development system 910 may include a source code editor 912 and a package builder 914. Source code editor 912 and package builder 914 may be included in a same computing device, or one or more of source code editor 912 and package builder 914 may be implemented in or more computing devices separate from those of others of source code editor 912 and package builder 914.

Computing device 902 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

A developer may interact with source code editor 912 to enter and modify program code when generating source code for a software component. For instance, the developer may add, modify, or delete program code text using source code editor 912 such as by typing, by voice input, by selecting suggested code blocks, etc. When complete, or at other intervals, the user may be enabled to save the program code by interacting with a "save" button or other user interface element. Source code editor 912 may be a browser based editor, a code editor integrated in a desktop or mobile application, or any other type of code editor.

A developer may also interact with source code editor 912 to enter and/or modify a manifest that describes the software component(s) and/or specifies the stack layer(s) to utilize the software component(s). The manifest may be written using a human-readable markup language, such as Extensible Markup Language (XML).

For instance, as shown in FIG. 9, a developer may interact with source code editor 912 to generate source code 916 and a manifest 918. Source code 916 is a collection of computer instructions (possibly with comments) written using a human-readable computer programming language. Examples of suitable human-readable computer programming languages include C, C++, Java, etc. Source code 916 may be received in one or more files or other form. For instance, source code 916 may be received as one or more ".c" files (when the C programming language is used), as one or more ".cpp" files (when the C++ programming language is used), etc. Package builder 914 may be configured to receive, compile, and/or build source code 916 into one or more library files (e.g., DLL file(s)) that represent the software component(s) and may be configured to receive manifest 918. Package builder 914 may generate a software component package 920 comprising the library file(s) and associated manifest 918.

The developer may upload package 920 to data store(s) 906 via network 908. Data store(s) 906 may comprise a repository of software application(s), operating system update(s), device driver(s), and/or software component package(s) 920 developed by one or more developers that are released and/or made available for downloading by the public (e.g., end users).

In accordance with an embodiment, software component package(s) 920 may be automatically downloaded (e.g., by computing device 102) upon an input device (e.g., input device 104) being attached to computing device 102. It is noted that certain component(s) of computing device 102 that are shown in FIG. 1 are not shown in FIG. 9 for brevity.

As described above in Subsection A, input device data generated by input device 102 may comprise an event that indicates that input device 102 has been attached to computing device 102. A raw input data processing layer (e.g., raw input data processing layer 202) of input stack 216, after converting the input device data into a format suitable for handling by other stack layer(s) of input stack 216, may determine that such an event is included in the input device data and cause operating system 112 to query data store(s) 906. For example, as shown in FIG. 9, operating system 112 may provide a query 922 to data store(s) for software component package(s) 920 associated with input device 104. Data store(s) 906 may provide a response to operating system 112 that includes the associated software component package(s) (e.g., software component package(s) 920.

Upon receiving the software component package(s), operating system 112 may extract the software component(s) (i.e., the library file(s) corresponding to the software component(s)) and manifest included therein and install each of the software component(s) for their corresponding stack layer. For example, suppose the software component packages comprise three software components A, B, and C. The manifest may specify that software component A is to be installed for input processing layer 206, software component B is to be installed for input routing layer 208, and software component C is to be installed for contextual processing layer 212. In this example, operating system 112 may install software component A via second programming interface 229, install software component B via third programming interface 231, and install software component C via fourth programming interface 233.

In accordance with an embodiment, software component(s) installed on computing device 102 may be loaded based on one or more activities being performed by the user. For example, software component(s) may be loaded based on application being used by the user, a particular feature of an application being used by the user and/or the input device being used by the user. For instance, if user loads a gaming application and a high-end gaming mouse device is attached to computing device 102 (i.e., a device that comprises an additional one or more buttons that the conventional one or two-button mouse device), operating system 112 may load software component(s) that extend the functionality of stack layer(s) of input stack 116 to support the additional button(s). When the user closes the gaming application, operating system 112 may unload such software component(s) (e.g., from memory 110). If a user loads another application or activates a feature or mode of the gaming application that requires other software component(s), operating system 112 may unload the previously-loaded software component(s) and/or load additional software components that extend the functionality of stack layer(s) of input stack 116 to support the other application or feature or mode of the gaming application.

In another example, if a user loads an application that support a three-dimensional coordinate system (e.g., a virtual reality application) and a virtual reality input device (e.g., a virtual reality headset and/or controller) that is operable to provide 3D inputs is being used by the user, operating system 112 may load software component(s) that extend the functionality of stack layer(s) of input stack 116 to support processing of the three-dimensional coordinate system. When the user closes the application, operating system 112 may unload the such software component(s). If a user loads another application or activates a feature or mode of the virtual reality application that requires other software component(s), operating system 112 may unload the previously-loaded software component(s) (e.g., from memory 110) and/or load additional software components that extend the functionality of stack layer(s) of input stack 116 to support the other application or feature or mode of the virtual reality application.

It is noted that the foregoing activities are just a few examples for dynamically loading and unloading software components that extend the functionality of input stack 116 and that software components may be dynamically loaded and/or unloaded based on other types of user activities.

By dynamically loading and unloading software component(s) based on activit(ies) being performed by the user, the amount of memory (e.g., memory 110) being utilized by computing device 102 may be reduced, thereby increasing the efficiency of computing device 102.

Figure 10:
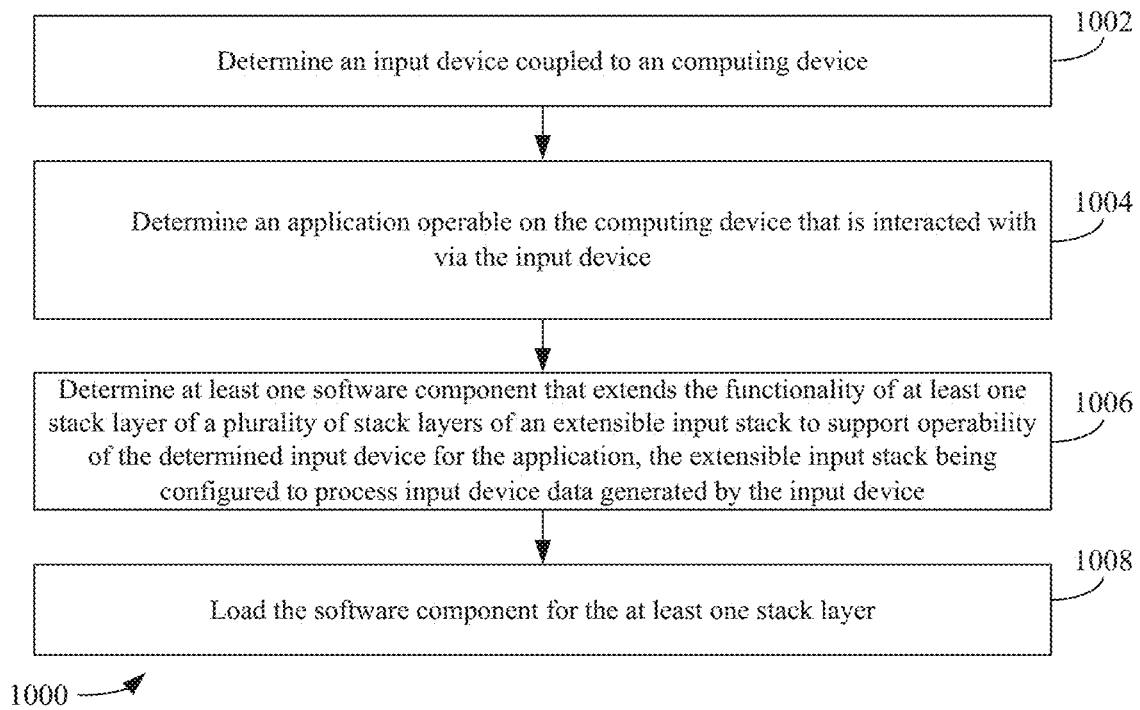
FIG. 10 shows a flowchart for dynamically loading software components to extend functionality of an input stack, according to an example embodiment.

Accordingly, software component(s) that extend the functionality of an input stack may be loaded dynamically in many ways. For instance, FIG. 10 shows a flowchart 1000 for dynamically loading software components to extend functionality of an input stack in accordance with an embodiment. In an embodiment, flowchart 1000 may be implemented by operating system 112, as shown in FIG. 9.

Flowchart 1000 begins with step 1002. In step 1002, an input device coupled to a computing device is determined. For example, with reference to FIG. 9, operating system 112 determines that input device 104 is coupled to computing device 102.

At step 1004, an application operable on the computing device that is interacted with via the input device is determined. For example, with reference to FIG. 9, operating system 112 determines an application operable on the computing device that is interacted with input device 104.

At step 1006, at least one software component that extends the functionality of at least one stack layer of a plurality of stack layers of an extensible input stack to support operability of the determined input device for the application is determined. The extensible input stack is configured to processing input device data generated by the input device. For example, with reference to FIG. 9, operating system 112 may determine at least one software component that extends the functionality of at least one stack layer layers 122 of input stack 116 to support the operability of input device 104 for the application.

At step 1008, the software component for the at least one stack layer is loaded. For example, with reference to FIG. 9, operating system 112 loads the software component for the at least one stack layer of layers 122.

In accordance with one or more embodiments, a second application operable on the computing device that is interacted with via the input device is determined, at least a second software component that extends the functionality of at least one stack layer of a plurality of stack layers of the extensible input stack to support operability of the determined input device for the second application is determined, and the second software component for the at least one stack layer is loaded. For example, with reference to FIG. 9, operating system 112 determines a second application operable on computing device 102 that is interacted with via input device 104, determines at least a second software component that extends the functionality of at least one stack layer of a layers 122 of input stack 116 to support operability of input device 104 for the second application, and loads the second software component for the at least one stack layer.

In accordance with one or more embodiments, the first software component is unloaded. For example, with reference to FIG. 9, operating system 112 unloads the first software component responsive to loading the second software component.

In accordance with one or more embodiments, the plurality of stack layers comprises a raw input data processing layer that is configured to convert input device data received from the input device into a format suitable for handling by at least one further layer of the extensible input stack.

In accordance with one or more embodiments, the plurality of stack layers further an input processing layer configured to determine that the converted input device data is one of a first type or a second type for routing to a corresponding operating system (OS) target component.

In accordance with one or more embodiments, the plurality of stack layers further comprises an input routing layer configured to determine a first target component of the OS to which the converted input device data is to be provided in response to the converted input device data being determined to be the first type. and determine a second target component of the OS to which the converted input device data is to be provided in response to the converted input device data being determined to be the second type.

In accordance with one or more embodiments, the plurality of stack layers further comprises a contextual processing layer configured to determine a first component-specific format in which the converted input device data is to be provided to the first target component and convert the converted input device data into the first component-specific format to generate first formatted input device data in response to the converted input device data being determined to be the first type. and determine a second component-specific format in which the converted input device data is to be provided to the second target component and convert the converted input device data into the second component-specific format to generate second formatted input device data in response to the converted input device data being determined to be the second type.

In accordance with one or more embodiments, the plurality of stack layers further comprises an application input player configured to provide the first formatted input device data to the first target component in response to the converted input device data being determined to be the first type and provide the second formatted input device data to the second target component in response to the converted input device data being determined to be the second type.

III. Example Mobile and Stationary Device Embodiments

Computing device 102, input device(s) 102, output device(s) 106, processor(s) 108, memory 110, operating system 112, device driver(s) 114, input stack 116, compositor(s) 118, target component(s) 120, plurality of stack layers 124, interface(s) 124, input device 204, memory 210, device driver 214, input stack 216, raw input data processing layer 202, input processing layer 206, input routing layer 208, contextual processing layer 212, application input layer 214, data interface 225, first communication interface 226, second communication interface 228, third communication interface 230, fourth communication interface 232, fifth communication interface 234, first programming interface 227, second programming interface 229, third programming interface 231, fourth programming interface 233, fifth programming interface 235, first compositor 218, second compositor 224, target component(s) 220, input device 404, memory 410, device driver 414, input stack 416, raw input data processing layer 402, input processing layer 406, data interface 425, first communication interface 426, second communication interface 428, input routing layer 608, third communication interface 630, first compositor 618, second compositor 624, contextual processing layer 812, application input layer 814, fourth communication interface 832, fifth communication interface 834, target component 802, second target component 804, computing device 902, data store(s) 906, software component development system 910, code editor 912, package builder 914, flowchart 300, flowchart 500, flowchart 700 and/or flowchart 1000 may be implemented in hardware, or hardware with any combination of software and/or firmware, or may be implemented as hardware logic/electrical circuitry, such as being implemented together in a system-on-chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. Processor(s) 108, operating system 112, device driver(s) 114, input stack 116, compositor(s) 118, target component(s) 120, plurality of stack layers 124, interface(s) 124, device driver 214, input stack 216, raw input data processing layer 202, input processing layer 206, input routing layer 208, contextual processing layer 212, application input layer 214, data interface 225, first communication interface 226, second communication interface 228, third communication interface 230, fourth communication interface 232, fifth communication interface 234, first programming interface 227, second programming interface 229, third programming interface 231, fourth programming interface 233, fifth programming interface 235, first compositor 218, second compositor 224, target component(s) 220, device driver 414, input stack 416, raw input data processing layer 402, input processing layer 406, data interface 425, first communication interface 426, second communication interface 428, input routing layer 608, third communication interface 630, first compositor 618, second compositor 624, contextual processing layer 812, application input layer 814, fourth communication interface 832, fifth communication interface 834, first target component 802, second target component 804, software component development system 910, code editor 912, package builder 914 flowchart 300, flowchart 500, flowchart 700, and/or flowchart 1000, may also be implemented as computer program code configured to be executed in one or more processors and stored in a computer readable storage medium.

Figure 11:
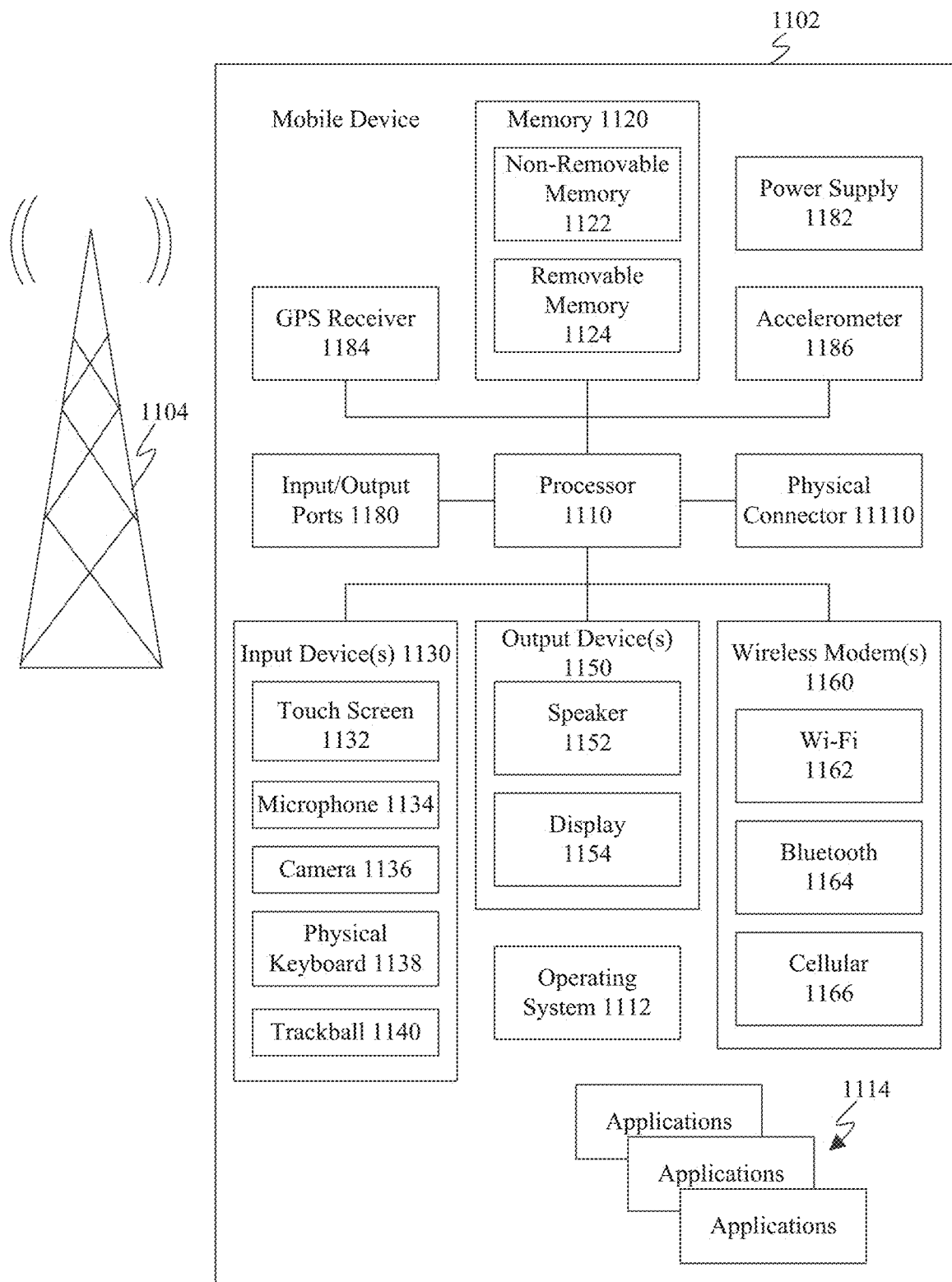
FIG. 11 is a block diagram of an exemplary user device in which embodiments may be implemented.

FIG. 11 shows a block diagram of an exemplary mobile device 1100 including a variety of optional hardware and software components, shown generally as components 1102. Any number and combination of the features/elements of components 1102 may be included in a mobile device embodiment, as well as additional and/or alternative features/elements, as would be known to persons skilled in the relevant art(s). It is noted that any of components 1102 can communicate with any other of components 1102, although not all connections are shown, for ease of illustration. Mobile device 1100 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1104, such as a cellular or satellite network, or with a local area or wide area network.

The illustrated mobile device 1100 can include a controller or processor referred to as processor circuit 1110 for performing such tasks as signal coding, image processing, data processing, input/output processing, power control, and/or other functions. Processor circuit 1110 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1110 may execute program code stored in a computer readable medium, such as program code of one or more applications 1114, operating system 1112, any program code stored in memory 1120, etc. Operating system 1112 can control the allocation and usage of the components 1102 and support for one or more application programs 1114 (a.k.a. applications, "apps", etc.). Application programs 1114 can include common mobile computing applications (e.g., email applications, calendars, contact managers, web browsers, messaging applications) and any other computing applications (e.g., word processing applications, mapping applications, media player applications).

As illustrated, mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1120. These programs include operating system 1112, one or more application programs 1114, and other program modules and program data. Examples of such application programs or program modules may include, for example, computer program logic (e.g., computer program code or instructions) for implementing, processor(s) 108, operating system 112, device driver(s) 114, input stack 116, compositor(s) 118, target component(s) 120, plurality of stack layers 124, interface(s) 124, device driver 214, input stack 216, raw input data processing layer 202, input processing layer 206, input routing layer 208, contextual processing layer 212, application input layer 214, data interface 225, first communication interface 226, second communication interface 228, third communication interface 230, fourth communication interface 232, fifth communication interface 234, first programming interface 227, second programming interface 229, third programming interface 231, fourth programming interface 233, fifth programming interface 235, first compositor 218, second compositor 224, target component(s) 220, device driver 414, input stack 416, raw input data processing layer 402, input processing layer 406, data interface 425, first communication interface 426, second communication interface 428, input routing layer 608, third communication interface 630, first compositor 618, second compositor 624, contextual processing layer 812, application input layer 814, fourth communication interface 832, fifth communication interface 834, first target component 802, second target component 804, software component development system 910, code editor 912, package builder 914 flowchart 300, flowchart 500, flowchart 700, and/or flowchart 1000.

Mobile device 1100 can support one or more input devices 1130, such as a touch screen 1132, microphone 1134, camera 1136, physical keyboard 1138 and/or trackball 1140 and one or more output devices 1150, such as a speaker 1152 and a display 1154.

Other possible output devices (not shown) can include piezoelectric or other haptic output devices. Some devices can serve more than one input/output function. For example, touch screen 1132 and display 1154 can be combined in a single input/output device. The input devices 1130 can include a Natural User Interface (NUI).

Wireless modem(s) 1160 can be coupled to antenna(s) (not shown) and can support two-way communications between processor circuit 1110 and external devices, as is well understood in the art. The modem(s) 1160 are shown generically and can include a cellular modem 1166 for communicating with the mobile communication network 1104 and/or other radio-based modems (e.g., Bluetooth 1164 and/or Wi-Fi 1162). Cellular modem 1166 may be configured to enable phone calls (and optionally transmit data) according to any suitable communication standard or technology, such as GSM, 3G, 4G, 5G, etc. At least one of the wireless modem(s) 1160 is typically configured for communication with one or more cellular networks, such as a GSM network for data and voice communications within a single cellular network, between cellular networks, or between the mobile device and a public switched telephone network (PSTN).

Mobile device 1100 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be not present and other components can be additionally present as would be recognized by one skilled in the art.

Figure 12:
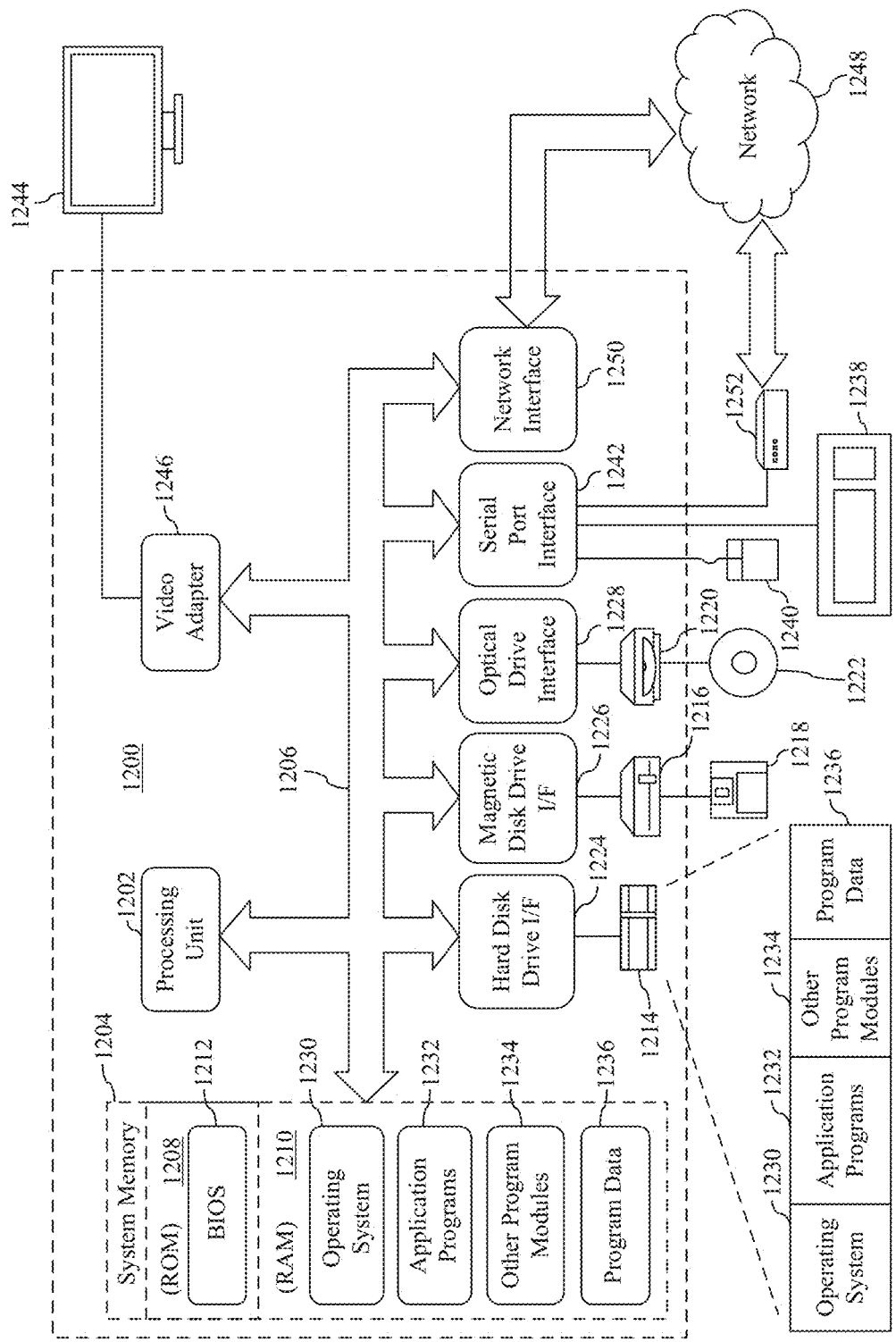
FIG. 12 is a block diagram of an example computing device that may be used to implement embodiments.

Furthermore, FIG. 12 depicts an exemplary implementation of a computing device 1200 in which embodiments may be implemented. The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing, processor(s) 108, operating system 112, device driver(s) 114, input stack 116, compositor(s) 118, target component(s) 120, plurality of stack layers 124, interface(s) 124, device driver 214, input stack 216, raw input data processing layer 202, input processing layer 206, input routing layer 208, contextual processing layer 212, application input layer 214, data interface 225, first communication interface 226, second communication interface 228, third communication interface 230, fourth communication interface 232, fifth communication interface 234, first programming interface 227, second programming interface 229, third programming interface 231, fourth programming interface 233, fifth programming interface 235, first compositor 218, second compositor 224, target component(s) 220, device driver 414, input stack 416, raw input data processing layer 402, input processing layer 406, data interface 425, first communication interface 426, second communication interface 428, input routing layer 608, third communication interface 630, first compositor 618, second compositor 624, contextual processing layer 812, application input layer 814, fourth communication interface 832, fifth communication interface 834, first target component 802, second target component 804, software component development system 910, code editor 912, package builder 914 flowchart 300, flowchart 500, flowchart 700, and/or flowchart 1000.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to generally refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media (including system memory 1204 of FIG. 12). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1252, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system includes: at least one processor; and at least one memory that stores program code configured to be executed by the at least one processor, the program code comprising: an extensible input stack configured to interface an operating system (OS) with input devices, the extensible input stack comprising a plurality of stack layers that include: a contextual processing layer having a communication interface configured to receive converted input device data from another stack layer in the extensible input stack, the contextual processing layer configured to: in response to the converted input device data being determined to be a first type, determine a first component-specific format in which the converted input device data is to be provided to a first target component, and convert the converted input device data into the first component-specific format to generate first formatted input device data; and in response to the converted input device data being determined to be a second type, determine a second component-specific format in which the converted input device data is to be provided to a second target component, and convert the converted input device data into the second component-specific format to generate second formatted input device data.

In one embodiment of the foregoing system, the plurality of stack layers further includes: a raw input data processing layer comprising a data interface configured to interface with a device driver of an input device to receive input device data generated by the input device and that is in accordance with a protocol specific to the input device, the raw input data processing layer configured to convert the input device data to generate the converted input device data, the converted input device data being in a format suitable for handling by at least one further layer in the extensible input stack, and an input processing layer comprising a second communication interface configured to receive the converted input device data and determine whether the converted input device data is of the first type or the second type for routing to a corresponding OS target component.

In another embodiment of the foregoing system, the first type is spatial input data and the second type is non-spatial input data.

In a further embodiment of the foregoing system, the plurality of stack layers further includes: an input routing layer having a third communication interface configured to receive the converted input device data, the input routing layer configured to: determine the first target component of the OS to which the converted input device data is to be provided in response to the converted input device data being determined to be the first type; and determine the second target component of the OS to which the converted input device data is to be provided in response to the converted input device data being determined to be the second type, the converted input device data being provided to the first communication interface of the contextual processing layer.

In yet another embodiment of the foregoing system, at least one of the first target component or the second target component is an application, a shell, or a service maintained by the OS.

In still another embodiment of the foregoing system, the input routing layer is configured to provide a hit test request included in the converted input device data to a first compositor of the OS and determine the first target component based on a first response specifying the first target component and received from the first compositor, and the input routing layer is configured to provide at least one focus change notification included in the converted input device data to a second compositor of the OS and determine the second target component based on a second response specifying the second target component and received from the second compositor.

In another embodiment of the foregoing system, the plurality of stack layers further includes: an application input layer having a second communication interface configured to: receive the first formatted input device data, the application input layer configured to provide the first formatted input device data to the first target component; and receive the second formatted input device data, the application input layer configured to provide the second formatted input device data to the second target component.

A method is also described. The method comprises: receiving, by a communication interface of a contextual processing layer of an extensible input stack, converted input device data; in response to the converted input device data being determined to be a first type: determining, by the contextual processing layer, a first component-specific format in which the converted input device data is to be provided to a first target component, and converting, by the contextual processing layer, the converted input device data into the first component-specific format to generate first formatted input device data; and in response to the converted input device data being determined to be a second type: determining, by the contextual processing layer, a second component-specific format in which the converted input device data is to be provided to a second target component, converting, by the contextual processing layer, the converted input device data into the second component-specific format to generate second formatted input device data.

In one embodiment of the foregoing method, the method further comprises: receiving, by a data interface of a raw input data processing layer of the extensible input stack, input device data generated by an input device and that is in accordance with a protocol specific to the input device, the data interface configured to interface with a device driver of the input device to receive the input device data from the input device; converting, by the raw input data processing layer, the input device data to generate the converted input device data, the converted input device data being in a format suitable for handling by at least one further layer in the extensible input stack; receiving, by a communication interface of an input processing layer of the extensible input stack, the converted input device data; and determining, by the input processing layer, that the converted input device data is one of the first type or the second type for routing to a corresponding OS target component.

In another embodiment of the foregoing method, the first type is spatial input data and the second type is non-spatial input data.

In yet another embodiment of the foregoing method, the method further comprises: receiving, by a communication interface of an input routing layer of the extensible input stack, the converted input device data; in response to the converted input device data being determined to be the first type: determining, by the input routing layer, the first target component of the OS to which the converted input device data is to be provided; and in response to the converted input device data being determined to be the second type: determining, by the input routing layer, the second target component of the OS to which the converted input device data is to be provided, the converted input device data being provided to the communication interface of the contextual processing layer.

In still another embodiment of the foregoing method, at least one of the first target component or the second target component is one of an application, a shell, or a service maintained by the OS.

In yet another embodiment of the foregoing method, the method further comprises: in response to the converted input device data being determined to be the first type: providing, by the input routing layer, a hit test request included in the converted input device data to a first compositor of the OS; and receiving, by the input routing layer, a first response from the first compositor that specifies the first target component; and in response to the converted input device data being determined to be the second type: providing, by the input routing layer, at least one focus change notification included in the converted input device data to a second compositor of the OS; and receiving, by the input routing layer, a second response from the second compositor of the OS that specifies the second target component and received from the second compositor.

In still another embodiment of the foregoing method, in response to the converted input device data being determined to be the first type, providing, by an application input layer of the extensible input stack, the first formatted input device data to the first target component; and in response to the converted input device data being determined to be the second type, providing, by the application input layer, the second formatted input device data to the second target component In yet another embodiment of the foregoing method, the communication interface of the input processing layer is a first application programming interface (API), the communication interface of the input routing layer a second API, the communication interface of the contextual processing layer is a third API.

A computer-readable storage medium having program instructions recorded thereon that, when executed by at least one processing circuit, perform a method for processing input device data via an extensible input stack is further described herein. The method comprises: receiving, by a communication interface of a contextual processing layer of the extensible input stack, converted input device data; in response to the converted input device data being determined to be a first type: determining, by the contextual processing layer, a first component-specific format in which the converted input device data is to be provided to a first target component, and converting, by the contextual processing layer, the converted input device data into the first component-specific format to generate first formatted input device data; and in response to the converted input device data being determined to be a second type: determining, by the contextual processing layer, a second component-specific format in which the converted input device data is to be provided to a second target component, converting, by the contextual processing layer, the converted input device data into the second component-specific format to generate second formatted input device data.

In one embodiment of the foregoing computer-readable storage medium, the method further comprises: receiving, by a data interface of a raw input data processing layer of the extensible input stack, input device data generated by an input device and that is in accordance with a protocol specific to the input device, the data interface configured to interface with a device driver of the input device to receive the input device data from the input device; converting, by the raw input data processing layer, the input device data to generate the converted input device data, the converted input device data being in a format suitable for handling by at least one further layer in the extensible input stack; receiving, by a communication interface of an input processing layer of the extensible input stack, the converted input device data; and determining, by the input processing layer, that the converted input device data is one of the first type or the second type for routing to a corresponding OS target component.

In another embodiment of the foregoing computer-readable storage medium, the first type is spatial input data and the second type is non-spatial input data.

In yet another embodiment of the foregoing computer-readable storage medium, the method further comprises: receiving, by a communication interface of an input routing layer of the extensible input stack, the converted input device data; in response to the converted input device data being determined to be the first type: determining, by the input routing layer, the first target component of the OS to which the converted input device data is to be provided; and in response to the converted input device data being determined to be the second type: determining, by the input routing layer, the second target component of the OS to which the converted input device data is to be provided, the converted input device data being provided to the communication interface of the contextual processing layer.

In still another embodiment of the foregoing computer-readable storage medium, determining at least one of the target component comprises: at least one of the first target component or the second target component is one of an application, a shell, or a service maintained by the OS.

A system is described herein. The system includes: at least one processor; and at least one memory that stores program code configured to be executed by the at least one processor, the program code comprising: an operating system configured to: determine an input device coupled to the computing device; determine an application operable on the computing device that is interacted with via the input device; determine at least one software component that extends the functionality of at least one stack layer of a plurality of stack layers of an extensible input stack to support operability of the determined input device for the application, the extensible input stack being configured to process input device data generated by the input device; and load the software component for the at least one stack layer.

In one embodiment of the foregoing system, the operating system is further configured to: determine a second application operable on the computing device that is interacted with via the input device; determine at least a second software component that extends the functionality of at least one stack layer of a plurality of stack layers of the extensible input stack to support operability of the determined input device for the second application; and load the second software component for the at least one stack layer.

In another embodiment of the foregoing system, the operating system is further configured to: unload the first software component.

In a further embodiment of the foregoing system, the plurality of stack layers comprises: a raw input data processing layer that is configured to convert input device data received from the input device into a format suitable for handling by at least one further layer of the extensible input stack.

In yet another embodiment of the foregoing system, the plurality of stack layers further comprises: an input processing layer configured to determine that the converted input device data is one of a first type or a second type for routing to a corresponding operating system (OS) target component.

In still another embodiment of the foregoing system, the plurality of stack layers further comprises: an input routing layer configured to: determine a first target component of the OS to which the converted input device data is to be provided in response to the converted input device data being determined to be the first type; and determine a second target component of the OS to which the converted input device data is to be provided in response to the converted input device data being determined to be the second type.

In another embodiment of the foregoing system, the plurality of stack layers further comprises: a contextual processing layer configured to: determine a first component-specific format in which the converted input device data is to be provided to the first target component and convert the converted input device data into the first component-specific format to generate first formatted input device data in response to the converted input device data being determined to be the first type; and determine a second component-specific format in which the converted input device data is to be provided to the second target component and convert the converted input device data into the second component-specific format to generate second formatted input device data in response to the converted input device data being determined to be the second type.

In yet another embodiment of the foregoing system, the plurality of stack layers further comprises: an application input player configured to: provide the first formatted input device data to the first target component in response to the converted input device data being determined to be the first type; and provide the second formatted input device data to the second target component in response to the converted input device data being determined to be the second type.

A method in a computing device is also described. The method comprises: determining an input device coupled to the computing device; determining an application operable on the computing device that is interacted with via the input device; determining at least one software component that extends the functionality of at least one stack layer of a plurality of stack layers of an extensible input stack to support operability of the determined input device for the application, the extensible input stack being configured to process input device data generated by the input device; and loading the software component for the at least one stack layer.

In one embodiment of the foregoing method, the method further comprises determining a second application operable on the computing device that is interacted with via the input device; determining at least a second software component that extends the functionality of at least one stack layer of a plurality of stack layers of the extensible input stack to support operability of the determined input device for the second application; and loading the second software component for the at least one stack layer.

In another embodiment of the foregoing method, the method further comprises: unloading the first software component.

In yet another embodiment of the foregoing method, the plurality of stack layers comprises: a raw input data processing layer that is configured to convert input device data received from the input device into a format suitable for handling by at least one further layer of the extensible input stack.

In still another embodiment of the foregoing method, the plurality of stack layers further comprises: an input processing layer configured to determine that the converted input device data is one of a first type or a second type for routing to a corresponding operating system (OS) target component.

In yet another embodiment of the foregoing method, the plurality of stack layers further comprises: an input routing layer configured to: determine a first target component of the OS to which the converted input device data is to be provided in response to the converted input device data being determined to be the first type; and determine a second target component of the OS to which the converted input device data is to be provided in response to the converted input device data being determined to be the second type.

In still another embodiment of the foregoing method, the plurality of stack layers further comprises: a contextual processing layer configured to: determine a first component-specific format in which the converted input device data is to be provided to the first target component and convert the converted input device data into the first component-specific format to generate first formatted input device data in response to the converted input device data being determined to be the first type; and determine a second component-specific format in which the converted input device data is to be provided to the second target component and convert the converted input device data into the second component-specific format to generate second formatted input device data in response to the converted input device data being determined to be the second type.

In yet another embodiment of the foregoing method, the plurality of stack layers further comprises: an application input player configured to: provide the first formatted input device data to the first target component in response to the converted input device data being determined to be the first type; and provide the second formatted input device data to the second target component in response to the converted input device data being determined to be the second type.

A computer-readable storage medium having program instructions recorded thereon that, when executed by at least one processing circuit, perform a method for dynamically loading a software component for an extensible input stack. The method comprises: determining an input device coupled to a computing device; determining an application operable on the computing device that is interacted with via the input device; determining at least one software component that extends the functionality of at least one stack layer of a plurality of stack layers of the extensible input stack to support operability of the determined input device for the application, the extensible input stack being configured to process input device data generated by the input device; and loading the software component for the at least one stack layer.

In one embodiment of the foregoing computer-readable storage medium, the method further comprises: determining a second application operable on the computing device that is interacted with via the input device; determining at least a second software component that extends the functionality of at least one stack layer of a plurality of stack layers of the extensible input stack to support operability of the deter-mined input device for the second application; and loading the second software component for the at least one stack layer.

In another embodiment of the foregoing computer-readable storage medium, the method further comprises: unloading the first software component.

V. Conclusion

While various embodiments have been described above, it should be understood that they have been presented by way of example only, and not limitation. It will be understood by those skilled in the relevant art(s) that various changes in form and details may be made therein without departing from the spirit and scope of the present subject matter as defined in the appended claims. Accordingly, the breadth and scope of the present subject matter should not be limited by any of the above-described exemplary embodiments, but should be defined only in accordance with the following claims and their equivalents.

The claims are shown as follows:

1. A system, comprising:
   at least one processor; and
   at least one memory that stores program code configured to be executed by the at least one processor, the program code comprising:
   an operating system configured to:
   determine an input device coupled to the computing device;
   determine an application operable on the computing device that is interacted with via the input device;
   determine at least one software component that extends the functionality of at least one stack layer of a plurality of stack layers of an extensible input stack to support operability of the determined input device for the application, the extensible input stack being configured to process input device data generated by the input device;
   load the software component for the at least one stack layer;
   determine a second application operable on the computing device that is interacted with via the input device;
   determine at least a second software component that extends the functionality of at least one stack layer of a plurality of stack layers of the extensible input stack to support operability of the determined input device for the second application; and
   load the second software component for the at least one stack layer.

2. The system of claim 1, wherein the operating system is further configured to:
   unload the first software component.

3. The system of claim 1, wherein the plurality of stack layers comprises:
   a raw input data processing layer that is configured to convert input device data received from the input device into a format suitable for handling by at least one further layer of the extensible input stack.

4. The system of claim 3, wherein the plurality of stack layers further comprises:
   an input processing layer configured to determine that the converted input device data is one of a first type or a second type for routing to a corresponding operating system (OS) target component.

5. The system of claim 4, wherein the plurality of stack layers further comprises:

an input routing layer configured to:
   determine a first target component of the OS to which the converted input device data is to be provided in response to the converted input device data being determined to be the first type; and
   determine a second target component of the OS to which the converted input device data is to be provided in response to the converted input device data being determined to be the second type.

6. The system of claim 5, wherein the plurality of stack layers further comprises:
a contextual processing layer configured to:
determine a first component-specific format in which the converted input device data is to be provided to the first target component and convert the converted input device data into the first component-specific format to generate first formatted input device data in response to the converted input device data being determined to be the first type; and determine a second component-specific format in which the converted input device data is to be provided to the second target component and convert the converted input device data into the second component-specific format to generate second formatted input device data in response to the converted input device data being determined to be the second type.

7. The system of claim 6, wherein the plurality of stack layers further comprises:
an application input layer configured to:
provide the first formatted input device data to the first target component in response to the converted input device data being determined to be the first type; and
provide the second formatted input device data to the second target component in response to the converted input device data being determined to be the second type.

8. A method in a computing device, comprising:
determining an input device coupled to the computing device;
determining an application operable on the computing device that is interacted with via the input device;
determining at least one software component that extends the functionality of at least one stack layer of a plurality of stack layers of an extensible input stack to support operability of the determined input device for the application, the extensible input stack being configured to process input device data generated by the input device;
loading the software component for the at least one stack layer;
determining a second application operable on the computing device that is interacted with via the input device;
determining at least a second software component that extends the functionality of at least one stack layer of a plurality of stack layers of the extensible input stack to support operability of the determined input device for the second application; and
loading the second software component for the at least one stack layer.

9. The method of claim 8, further comprising:
unloading the first software component.

10. The method of claim 8, wherein the plurality of stack layers comprises:
a raw input data processing layer that is configured to convert input device data received from the input device into a format suitable for handling by at least one further layer of the extensible input stack.

11. The method of claim 10, wherein the plurality of stack layers further comprises:
an input processing layer configured to determine that the converted input device data is one of a first type or a second type for routing to a corresponding operating system (OS) target component.

12. The method of claim 11, wherein the plurality of stack layers further comprises:
an input routing layer configured to:
   determine a first target component of the OS to which the converted input device data is to be provided in response to the converted input device data being determined to be the first type; and
   determine a second target component of the OS to which the converted input device data is to be provided in response to the converted input device data being determined to be the second type.

13. The method of claim 12, wherein the plurality of stack layers further comprises:
a contextual processing layer configured to:
determine a first component-specific format in which the converted input device data is to be provided to the first target component and convert the converted input device data into the first component-specific format to generate first formatted input device data in response to the converted input device data being determined to be the first type; and determine a second component-specific format in which the converted input device data is to be provided to the second target component and convert the converted input device data into the second component-specific format to generate second formatted input device data in response to the converted input device data being determined to be the second type.

14. The method of claim 13, wherein the plurality of stack layers further comprises:
an application input layer configured to:
provide the first formatted input device data to the first target component in response to the converted input device data being determined to be the first type; and
provide the second formatted input device data to the second target component in response to the converted input device data being determined to be the second type.

15. A computer-readable storage medium having program instructions recorded thereon that, when executed by at least one processor, perform a method for dynamically loading a software component for an extensible input stack, the method comprising:
determining an input device coupled to a computing device;
determining an application operable on the computing device that is interacted with via the input device;
determining at least one software component that extends the functionality of at least one stack layer of a plurality of stack layers of the extensible input stack to support operability of the determined input device for the application, the extensible input stack being configured to process input device data generated by the input device;
loading the software component for the at least one stack layer; and
determining a second application operable on the computing device that is interacted with via the input device;
determining at least a second software component that extends the functionality of at least one stack layer of a plurality of stack layers of the extensible input stack to support operability of the determined input device for the second application; and loading the second software component for the at least one stack layer.

16. The computer-readable storage medium of claim 15, the method further comprising:

unloading the first software component.

17. The computer-readable storage medium of claim 15, wherein the plurality of stack layers comprises:

a raw input data processing layer that is configured to convert input device data received from the input device into a format suitable for handling by at least one further layer of the extensible input stack.

18. The computer-readable storage medium of claim 17, wherein the plurality of stack layers further comprises:

an input processing layer configured to determine that the converted input device data is one of a first type or a second type for routing to a corresponding operating system (OS) target component.

19. The computer-readable storage medium of claim 18, wherein the plurality of stack layers further comprises:

an input routing layer configured to:

determine a first target component of the OS to which the converted input device data is to be provided in response to the converted input device data being determined to be the first type; and determine a second target component of the OS to which the converted input device data is to be provided in response to the converted input device data being determined to be the second type.

20. The computer-readable storage medium of claim 19, wherein the plurality of stack layers further comprises:

a contextual processing layer configured to:

determine a first component-specific format in which the converted input device data is to be provided to the first target component and convert the converted input device data into the first component-specific format to generate first formatted input device data in response to the converted input device data being determined to be the first type; and determine a second component-specific format in which the converted input device data is to be provided to the second target component and convert the converted input device data into the second component-specific format to generate second formatted input device data in response to the converted input device data being determined to be the second type.

* * * * *